(12) United States Patent
Zavitz et al.

(10) Patent No.: US 8,322,093 B2
(45) Date of Patent: Dec. 4, 2012

(54) BASE SUPPORT FOR WIND-DRIVEN POWER GENERATORS

(75) Inventors: Bryant A. Zavitz, Dunwoody, GA (US); Kevin L. Kirkley, Atlanta, GA (US)

(73) Assignee: Tindall Corporation, Spartanburg, SC (US)

( * ) Notice: Subject to any disclaimer, the term of this patent is extended or adjusted under 35 U.S.C. 154(b) by 476 days.

(21) Appl. No.: 12/482,634

(22) Filed: Jun. 11, 2009

(65) Prior Publication Data

US 2009/0307998 A1 Dec. 17, 2009

Related U.S. Application Data

(60) Provisional application No. 61/061,173, filed on Jun. 13, 2008, provisional application No. 61/113,354, filed on Nov. 11, 2008, provisional application No. 61/143,460, filed on Jan. 9, 2009, provisional application No. 61/171,965, filed on Apr. 23, 2009, provisional application No. 61/174,700, filed on May 1, 2009.

(51) Int. Cl.
| | |
|---|---|
| *E02D 27/34* | (2006.01) |
| *E04C 3/34* | (2006.01) |
| *E04C 5/00* | (2006.01) |

(52) U.S. Cl. ........... 52/223.5; 52/296; 52/848; 405/250; 405/252; 405/256; 416/DIG. 6

(58) Field of Classification Search ................ 52/40, 82, 52/223.3, 223.4, 223.5, 247, 296, 297, 300, 52/301, 651.07, 843, 848; 416/DIG. 6; 405/250, 405/252, 256; 174/45 R; 290/44, 55; 343/875

See application file for complete search history.

(56) References Cited

U.S. PATENT DOCUMENTS

| 154,393 | A | 8/1874 | Hill |
|---|---|---|---|
| 617,228 | A | 1/1899 | Damm |
| 890,373 | A | 6/1908 | Orr |
| 1,031,050 | A | 7/1912 | Conzelman |
| 1,050,130 | A | 1/1913 | Harvey |
| 1,069,328 | A | 8/1913 | Griffin |

(Continued)

FOREIGN PATENT DOCUMENTS

DE 2 209 978 9/1973

(Continued)

OTHER PUBLICATIONS

Micon Technical Specification MICON M530—250 KW, Micon A/S, Nov. 20, 1989.

(Continued)

*Primary Examiner* — Robert Canfield
(74) *Attorney, Agent, or Firm* — Dority & Manning, P.A.

(57) ABSTRACT

Disclosed are apparatus and corresponding methodology for providing a base support, such as including concrete, and used such as for a wind-driven generator. Precast concrete cylinders are stacked in place upon a platform that may be partially precast and partially cast in place during assembly and supported, in certain embodiments, by plural concrete legs, the other ends of which are supported on a unitary or subdivided concrete foundation. In other embodiments, the platform may be supported by ribbed concrete panels. The concrete cylinders are glued together using an epoxy and then secured by an internal vertical post tension system extending from the platform to the upper most cylinder. Different types of concrete are used between upper and lower sections of the stacked cylinders. The lower section uses reinforced concrete while the upper section used ultra high performance fiber reinforced concrete.

17 Claims, 18 Drawing Sheets

U.S. PATENT DOCUMENTS

| | | | |
|---|---|---|---|
| 1,194,305 A | 8/1916 | McMillan | |
| 1,264,063 A | 4/1918 | Guichard | |
| 1,425,860 A * | 8/1922 | Johnson | 52/21 |
| 1,497,141 A | 6/1924 | Hart | |
| 1,545,456 A | 7/1925 | Rastetter | |
| 1,567,301 A | 12/1925 | Ross | |
| 1,647,925 A | 11/1927 | May | |
| 2,032,030 A | 2/1936 | Talen | |
| 2,145,232 A | 1/1939 | Bauer | |
| 2,374,624 A | 4/1945 | Schwendt | |
| 2,483,175 A | 9/1949 | Billner | |
| 2,524,390 A * | 10/1950 | Laubach et al. | 138/39 |
| 2,826,800 A * | 3/1958 | Van Buren | 249/205 |
| 2,858,693 A * | 11/1958 | Levert | 52/247 |
| 2,958,983 A | 11/1960 | Hoover | |
| 2,966,714 A | 1/1961 | Eways et al. | |
| 3,182,948 A | 5/1965 | Lawrence | |
| 3,230,911 A * | 1/1966 | Garlock, Jr | 109/1 R |
| 3,293,345 A | 12/1966 | Zebrowski et al. | |
| 3,363,795 A * | 1/1968 | Stuart, III | 220/567 |
| 3,476,847 A | 11/1969 | Drever et al. | |
| 3,533,819 A | 10/1970 | Pennachetti et al. | |
| 3,653,168 A | 4/1972 | Cook | |
| 3,659,077 A | 4/1972 | Olson | |
| RE27,732 E | 8/1973 | Van Buren | |
| 3,763,608 A * | 10/1973 | Chamlee | 52/81.4 |
| 3,793,794 A | 2/1974 | Archer et al. | |
| 3,999,337 A * | 12/1976 | Tomassetti et al. | 52/82 |
| 4,025,021 A | 5/1977 | Stout | |
| 4,077,174 A | 3/1978 | de Leaumont | |
| 4,137,535 A | 1/1979 | Rupprecht | |
| 4,148,850 A | 4/1979 | Schulte et al. | |
| 4,155,210 A | 5/1979 | de Leaumont | |
| 4,166,347 A * | 9/1979 | Pohlman et al. | 52/223.4 |
| 4,191,521 A | 3/1980 | Muldery et al. | |
| 4,196,551 A | 4/1980 | Bondarenko et al. | |
| 4,244,682 A | 1/1981 | Willingham | |
| 4,272,929 A | 6/1981 | Hanson | |
| 4,403,916 A | 9/1983 | Skelskey | |
| 4,406,094 A | 9/1983 | Hempel et al. | |
| 4,479,334 A | 10/1984 | Goode | |
| 4,488,392 A * | 12/1984 | Pearcey et al. | 52/741.11 |
| 4,555,888 A * | 12/1985 | Goldenberg et al. | 52/223.7 |
| 4,594,824 A | 6/1986 | Ziegler et al. | |
| 4,655,013 A * | 4/1987 | Ritland | 52/81.4 |
| 4,663,900 A | 5/1987 | Rehm et al. | |
| 4,708,621 A | 11/1987 | Schmidgall et al. | |
| 4,799,307 A | 1/1989 | Reigstad et al. | |
| 4,826,639 A | 5/1989 | Vidal et al. | |
| 4,910,940 A | 3/1990 | Grady, II | |
| 5,038,540 A | 8/1991 | Krautz | |
| 5,056,284 A | 10/1991 | Ruckdeschel et al. | |
| 5,586,417 A | 12/1996 | Henderson et al. | |
| 5,724,775 A * | 3/1998 | Zobel et al. | 52/82 |
| 5,749,198 A | 5/1998 | Johnson | |
| 5,757,088 A | 5/1998 | Baeumen et al. | |
| 5,969,243 A | 10/1999 | Frey et al. | |
| 6,167,673 B1 | 1/2001 | Fournier | |
| 6,170,220 B1 | 1/2001 | Moore, Jr. | |
| 6,176,055 B1 | 1/2001 | Fu | |
| 6,278,198 B1 | 8/2001 | Willis et al. | |
| 6,283,269 B1 | 9/2001 | Mayer | |
| 6,299,336 B1 | 10/2001 | Hulse | |
| 6,318,034 B1 | 11/2001 | Zavitz et al. | |
| 6,408,575 B1 | 6/2002 | Yoshida et al. | |
| 6,467,233 B1 | 10/2002 | Maliszewski et al. | |
| 6,470,645 B1 | 10/2002 | Maliszewski et al. | |
| 6,522,025 B2 | 2/2003 | Willis et al. | |
| 6,532,700 B1 | 3/2003 | Maliszewski et al. | |
| 6,614,125 B2 | 9/2003 | Willis et al. | |
| 6,658,812 B1 * | 12/2003 | Tomlinson et al. | 52/745.07 |
| 6,782,667 B2 | 8/2004 | Henderson | |
| 6,834,911 B2 | 12/2004 | Schillinger et al. | |
| 6,851,231 B2 * | 2/2005 | Tadros et al. | 52/223.4 |
| 6,859,768 B1 | 2/2005 | Wakelam et al. | |
| 6,883,532 B2 | 4/2005 | Rau | |
| 6,888,264 B1 | 5/2005 | Willis et al. | |
| 6,903,705 B2 | 6/2005 | Livadiotti | |
| 6,906,684 B2 | 6/2005 | Turner | |
| 6,907,706 B1 | 6/2005 | Schippmann et al. | |
| 7,011,108 B2 | 3/2006 | Benckert et al. | |
| 7,021,020 B2 | 4/2006 | Simmons et al. | |
| 7,114,295 B2 | 10/2006 | Wobben | |
| 7,152,384 B1 * | 12/2006 | McCarty | 52/639 |
| 7,160,085 B2 | 1/2007 | de Roest | |
| 7,197,854 B2 | 4/2007 | Bettigole et al. | |
| 7,276,808 B2 | 10/2007 | Weitkamp et al. | |
| 7,360,340 B2 | 4/2008 | Grundman et al. | |
| 7,464,512 B1 | 12/2008 | Perina | |
| 7,739,843 B2 * | 6/2010 | Cortina-Cordero | 52/223.5 |
| 7,770,343 B2 | 8/2010 | Montaner Fraguet et al. | |
| 7,980,814 B2 | 7/2011 | Nieuwenhuizen | |
| 8,104,242 B1 * | 1/2012 | Fouad et al. | 52/223.4 |
| 8,136,329 B2 | 3/2012 | Willis | |
| 8,146,320 B2 | 4/2012 | Seidel et al. | |
| 2003/0000165 A1 | 1/2003 | Tadros et al. | |
| 2003/0021636 A1 | 1/2003 | Silber | |
| 2004/0237419 A1 | 12/2004 | Powell | |
| 2005/0105969 A1 | 5/2005 | Smith | |
| 2005/0120644 A1 | 6/2005 | Tadros et al. | |
| 2005/0129504 A1 | 6/2005 | De Roest | |
| 2005/0166521 A1 | 8/2005 | Silber | |
| 2006/0120809 A1 | 6/2006 | Ingram et al. | |
| 2006/0156681 A1 | 7/2006 | Fernandez Gomez et al. | |
| 2006/0254168 A1 | 11/2006 | Wobben | |
| 2006/0254196 A1 | 11/2006 | Wobben | |
| 2006/0267348 A1 | 11/2006 | Weitkamp et al. | |
| 2007/0095008 A1 | 5/2007 | Arsene | |
| 2007/0243063 A1 | 10/2007 | Schellstede | |
| 2007/0251187 A1 | 11/2007 | Schiffer et al. | |
| 2007/0269272 A1 | 11/2007 | Kothnur et al. | |
| 2008/0028715 A1 | 2/2008 | Foss et al. | |
| 2008/0040983 A1 | 2/2008 | Fernandez Gomez et al. | |
| 2008/0209842 A1 | 9/2008 | Montaner Fraguet et al. | |
| 2009/0000227 A1 | 1/2009 | Jakubowski et al. | |
| 2009/0031639 A1 * | 2/2009 | Cortina/Cordero | 52/40 |
| 2010/0071301 A1 * | 3/2010 | Herrius de Roest | 52/651.07 |
| 2010/0139181 A1 | 6/2010 | Cortina-Cordero et al. | |
| 2011/0056151 A1 | 3/2011 | Marmo et al. | |
| 2011/0113708 A1 | 5/2011 | Skjaerbaek et al. | |
| 2011/0138704 A1 | 6/2011 | Bagepalli et al. | |
| 2011/0138707 A1 | 6/2011 | Bagepalli | |
| 2011/0239564 A1 | 10/2011 | Zheng et al. | |
| 2011/0278431 A1 | 11/2011 | Knox et al. | |
| 2011/0314767 A1 | 12/2011 | Gee | |
| 2012/0017536 A1 * | 1/2012 | Hager | 52/651.01 |

FOREIGN PATENT DOCUMENTS

| | | |
|---|---|---|
| DE | 38 42 026 | 7/1990 |
| DE | 40 23 465 | 2/1992 |
| DE | 41 00 995 | 7/1992 |
| DE | 198 32 921 | 2/2000 |
| DE | 203 09 447 | 9/2003 |
| EP | 0 960 986 | 12/1999 |
| EP | 1 156 175 | 11/2001 |
| FR | 544863 | 10/1922 |
| FR | 1145789 | 10/1957 |
| GB | 2 366 820 | 3/2002 |
| JP | 55-32813 | 3/1980 |
| JP | 4-189986 | 7/1992 |
| JP | 9-111759 | 4/1997 |
| JP | 9-189148 | 7/1997 |
| JP | 9-195584 | 7/1997 |
| JP | 9-235912 | 9/1997 |
| JP | 9-250256 | 9/1997 |
| JP | 3074144 | 12/2000 |
| JP | 2001-200658 | 7/2001 |
| JP | 2004-11210 | 1/2004 |
| JP | 2008-248476 | 10/2008 |
| JP | 2009-19550 | 1/2009 |
| SE | 111 151 | 7/1944 |
| WO | WO 2005/028781 | 3/2005 |

OTHER PUBLICATIONS

Khatri International Newsletter, Khatri International Structural and Civil Engineers, Sep. 2002.

"From the European Front: Tower Power", *Concrete Products*, Apr. 1, 2003; provided by Liebherr-Mischtechnik GmbH, represented in North America by Virginia-based Liebherr Concrete.

Autocor brochure (Automatic concrete placing on rail) by Putzmeister, copyright 2004.

"LWST Phase I Project Conceptual Design Study: Evaluation of Design and Construction Approaches for Economical Hybrid Steel/Concrete Wind Turbine Towers Jun. 28, 2002-Jul. 31, 2004" by M.W. LaNier, a Subcontractor Report for National Renewable Energy Laboratory, Jan. 2005 (document available at http://www.nrel.gov/docs/fy05osti/36777.pdf).

Advanced Tower Systems ATS Hybrid Tower from Advanced Tower Systems website (www.advancedtowers.com).

"Danish wind turbines (1): Portrait of Micon's 250 kW turbine" by Strange skriver, technical consultant of Danish Wind Turbine Owners' Association, *Naturlig Energi* Magazine, Sep. 2005.

*Putzmeister Post, The Magazine for Our Customers and Friends*, copyright 2005.

"Advanced Wind Technology: New Challenges for a New Century" by R. Thresher and A. Laxson, presented at the European Wind Energy Conference in Athens, Greece, Feb. 27-Mar. 2, 2006.

"Automated concrete placement in a precasting plant", Putzmeister AG—Concrete Pumps—Autocor, copyright 1998-2006.

"Precast concrete elements for the wind power industry, Autocor system in operation at Emden, German", Putzmeister AG, BFT, Aug. 2006.

"Patents in Structural Engineering" by Christopher A. Rothe, Esq., *Structure*Magazine, Nov. 2008.

Grupo INNEO Precast Concrete Wind Towers website information, copyright 2008 (www.inneotorres.com).

"Three Promising Projects on the Orkneys", International, WINDBLATT Mar. 2009, pp. 14 and 15.

"Precision Teamwork on Precast Concrete Towers", Job Profiles, WINDBLATT Mar. 2009, pp. 16 and 17.

International Search Report for PCT International Application PCT/US2009/047136 dated Aug. 4, 2009.

Machine translation of abstract of JP 9111759 (reported above), Apr. 1997.

PCT International Search Report for PCT International Application No. PCT/US2009/047135 dated Jan. 27, 2011.

Written Opinion of the International Searching Authority for PCT International Application No. PCT/US02009/047135 dated Jan. 27, 2011.

Automated translation of DE 2 209 978 (translated abstract not available), Sep. 1973.

Automated translation of DE 38 42 026 and translated abstract, Jul. 1990.

Automated translation of DE 40 23 465 and translated abstract, Feb. 1992.

Automated translation of DE 41 00 995 and translated abstract, Jul. 1992.

Automated translation of DE 198 32 921 and translated abstract, Feb. 2000.

Automated translation of EP 1 156 175 and translated abstract, Nov. 2001.

Automated translation of EP 0 960 986, Dec. 1999.

Automated translation of FR 544.863 (translated abstract not available), Oct. 1992.

Automated translation of Abstract of JP 4-189986, Jul. 1992.

Automated translation of Abstract of JP 2001-200658, Jul. 2001.

Automated translation of Abstract of DE 203 09 447, Sep. 2003.

Automated translation of FR 1.145.789 (translated abstract not available), Oct. 1957.

Automated translation of Abstract of JP 9-189148, Jul. 1997.

Automated translation of Abstract of JP 9-195584, Jul. 1997.

Automated translation of Abstract of JP 9-250256, Sep. 1997.

Automated translation of Abstract of JP 9-235912, Sep. 1997.

Translation of JP 55-32813, Mar. 1980.

Translation of JP 3074144, Dec. 2000.

Translation of face/abstract of JP 2004011210, Jan. 2004.

Translation of face/abstract of JP 2008248476, Oct. 2008.

Written Opinion of the International Searching Authority for PCT International Application No. PCT/US2009/047136 completed Jul. 24, 2009, mailed Aug. 4, 2009.

* cited by examiner

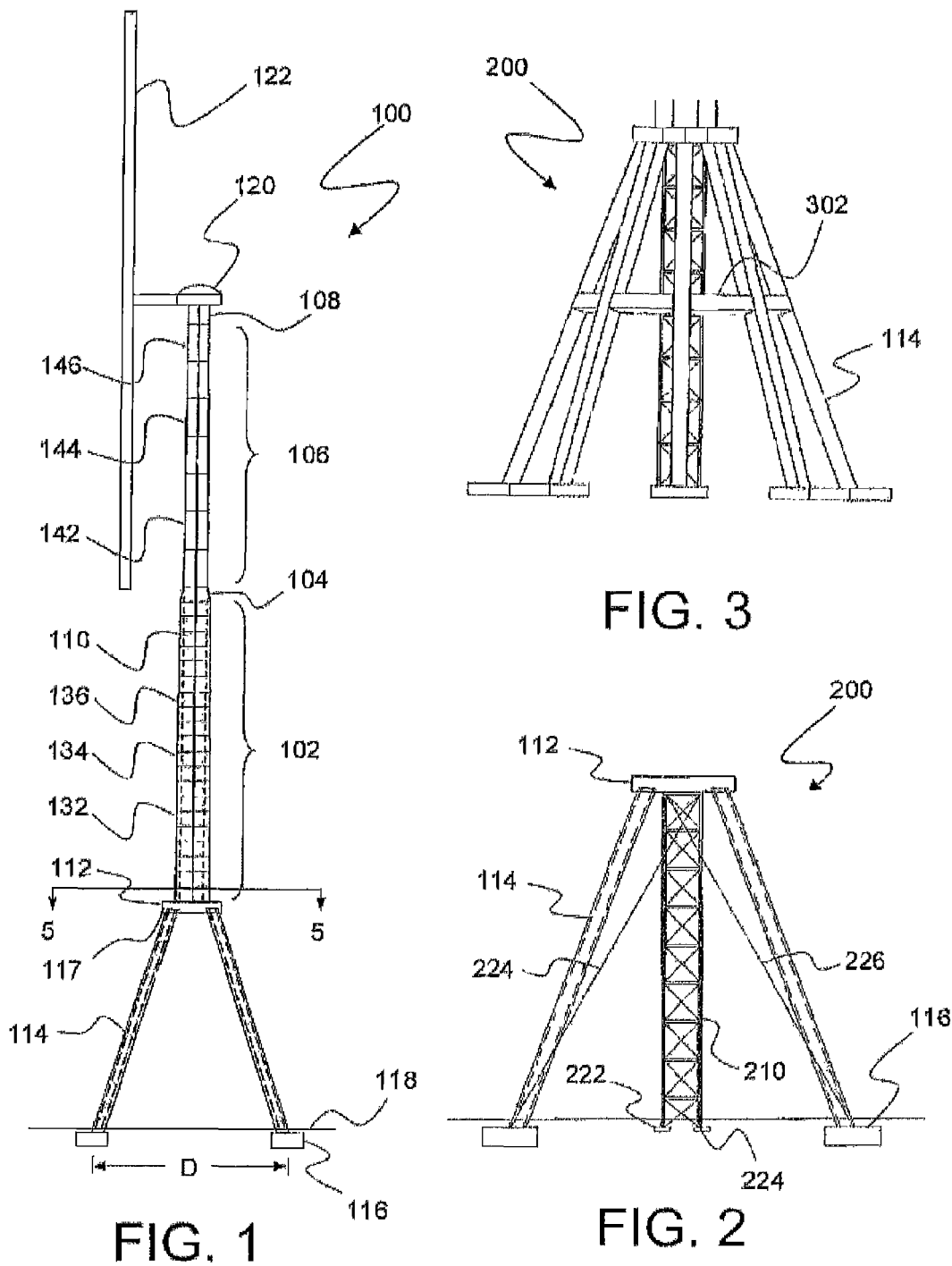

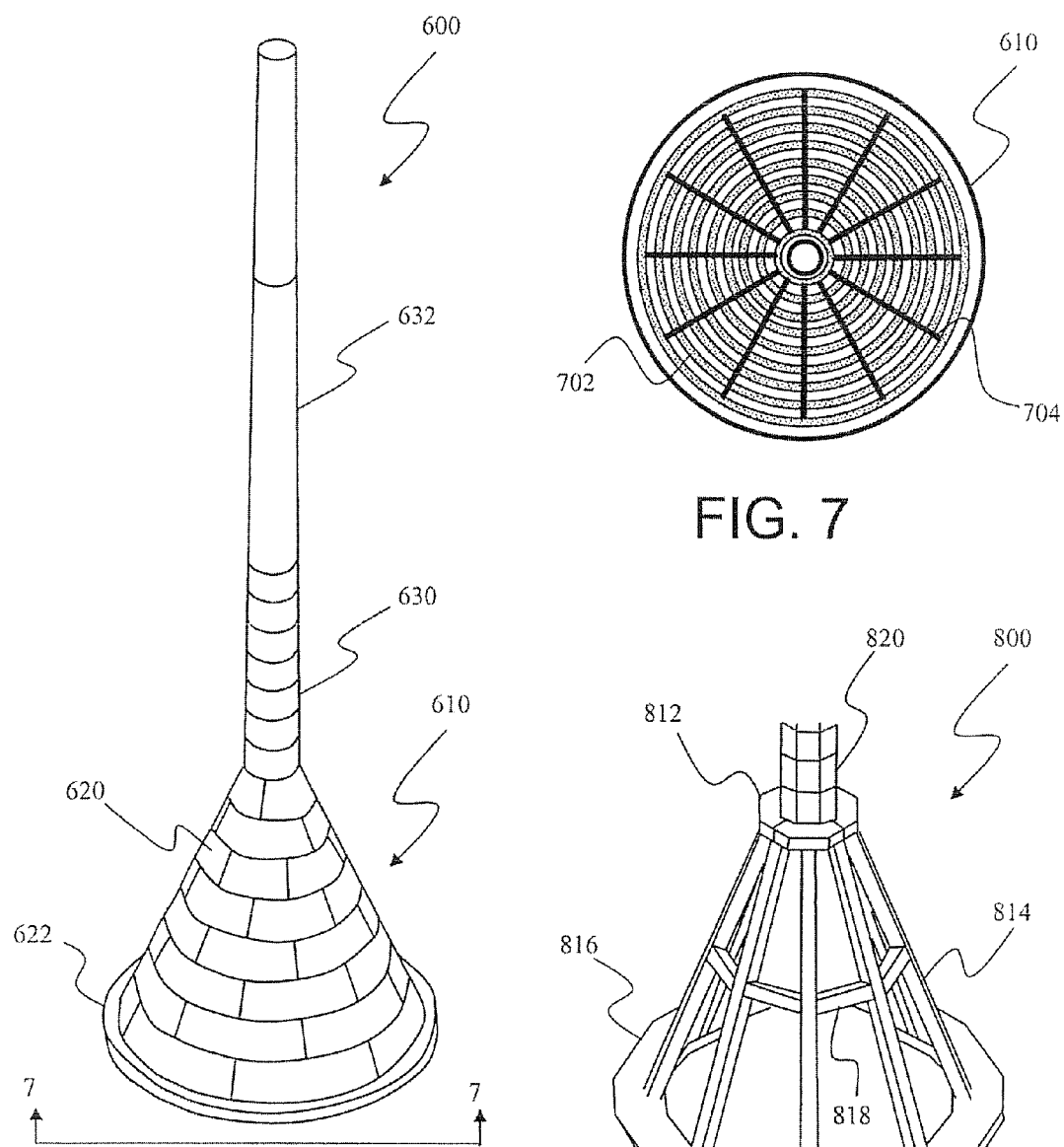

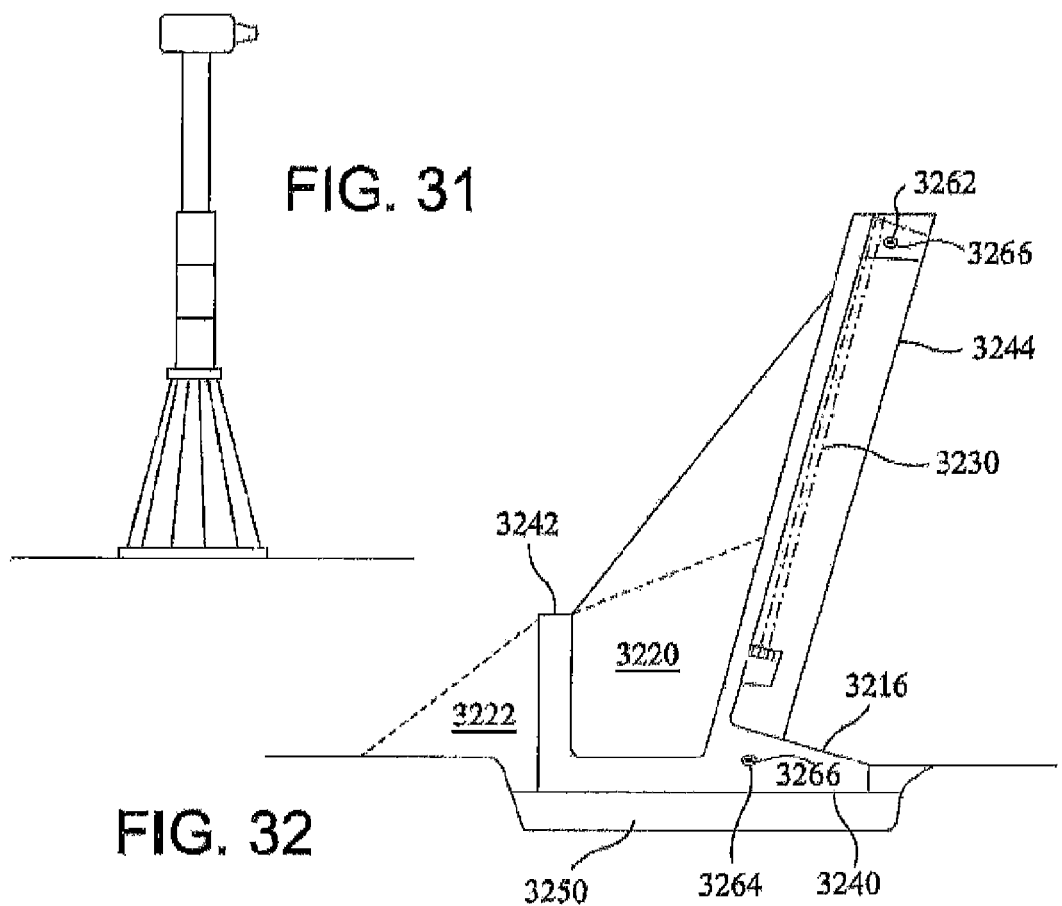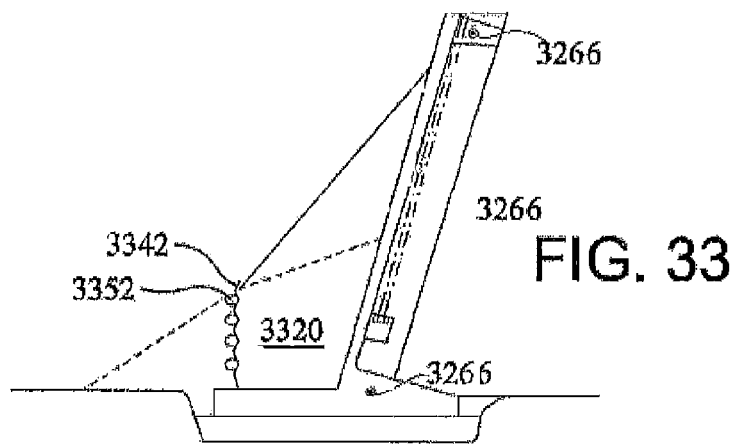

BASE SUPPORT FOR WIND-DRIVEN POWER GENERATORS

PRIORITY CLAIM

This application claims the benefit of previously filed U.S. Provisional Patent Application entitled "CONCRETE BASE SUPPORT FOR WIND-DRIVEN POWER GENERATORS," assigned U.S. Ser. No. 61/061,173, filed Jun. 13, 2008; and claims the benefit of previously filed U.S. Provisional Patent Application entitled "BASE SUPPORT FOR WIND-DRIVEN POWER GENERATORS," assigned U.S. Ser. No. 61/113,354, filed Nov. 11, 2008; and claims the benefit of previously filed U.S. Provisional Patent Application entitled "BASE SUPPORT FOR WIND-DRIVEN POWER GENERATORS," assigned U.S. Ser. No. 61/143,460, filed Jan. 9, 2009; and claims the benefit of previously filed U.S. Provisional Patent Application entitled "BASE SUPPORT FOR WIND-DRIVEN POWER GENERATORS," assigned U.S. Ser. No. 61/171,965, filed Apr. 23, 2009; and claims the benefit of previously filed U.S. Provisional Patent Application entitled "METHOD AND APPARATUS FOR FABRICATION OF STRUCTURES USED IN CONSTRUCTION OF TOWER BASE SUPPORTS," assigned 61/174,700, filed May 1, 2009; all of which are fully incorporated herein by reference for all purposes.

FIELD OF THE INVENTION

The present subject matter relates to towers. More specifically, the present subject matter relates to tower construction and methodologies for assembly, such as may be provided involving precast concrete and used in conjunction with dynamic structures such as wind-driven power generators or windmills.

BACKGROUND OF THE INVENTION

Construction of towers for support of various items has been practiced for many years. Various towers of various materials have been provided to support electrical transmission lines including wooden, steel, and, more recently, concrete. In like manner, wind driven apparatus including windmills and wind-driven power generators in various forms and designed for many purposes, including pumping of water from wells as well as, more recently, generation of electrical power, have also been developed.

U.S. Pat. No. 3,793,794 to Archer et al. entitled "Stacked Column" is directed to a column comprised of a plurality of concrete-filled stacked tubes.

U.S. Pat. No. 4,406,094 to Hempel et al. entitled "Apparatus for Anchoring Self-supporting, Tall Structures" is directed to an anchoring self-supporting tall structure such as masts, towers, or the like in a foundation. The mast or tower may be used to support a wind-driven power generator.

U.S. Pat. No. 5,761,875 to Oliphant et al. entitled "Reinforced concrete Pole with Attachment Mechanism" is directed to an attachment mechanism which provides a structurally sound means to attach a reinforced concrete pole to a support structure.

U.S. Pat. No. 6,532,700 to Maliszewski et al. entitled "Flange With Cut For Wind Tower" is directed to a flange for making a tower for a wind generator made up of a plurality of cylindrical steel segments.

U.S. Pat. No. 7,155,875 to Henderson entitled "Method of Forming a Perimeter Weighted Foundation For Wind Turbines And The Like" is directed to a weighted foundation having a central pier pedestal and an enlarged base space outwardly and extending below the pedestal.

U.S. Pat. No. 5,586,417 to Henderson, et al. entitled "Tensionless pier foundation" is directed to a hollow, cylindrical pier foundation is constructed of cementitious material poured in situ between inner and outer cylindrical corrugated metal pipe shells.

The disclosures of all the patents referenced herein are incorporated by reference, for all purposes.

In an article entitled "Precast concrete elements for wind power industry," German company Enercon GmbH has described methodology for casting concrete. Mexican company Postensa Wind Structures describes on its website www.postensaws.com a tilt up, precast on-site construction system for concrete towers for use with wind driven power generators.

While various implementations of tower constructions have been developed, and while various combinations of materials have been employed for tower construction, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodology are presently disclosed for providing base supports for windmills and wind-driven power generators (e.g., wind turbines). It should be appreciated that while the present disclosure is directed in exemplary fashion to support structure involving precast concrete, various presently disclosed constructions may be alternatively practiced in accordance with the present subject matter.

In addition, it should be appreciated that while the present disclosure is directed in exemplary fashion to support structure for windmills and similar devices, such is not necessarily a specific limitation of the present subject matter. For example, it should be clear to those of ordinary skill in the art that a tower constructed in accordance with the present technology may well be used to support, for example, a television transmitter aerial or other radio signal broadcasting aerial. Alternatively, towers constructed in accordance with present technology may be used to support any type device that may require placement above local ground level for more effective operation. Such other present uses may include, for example, such as electrical power transmission lines and athletic field lighting equipment.

In one exemplary configuration, support for windmills may be provided by stacking on-site a plurality of precast concrete cylinders to form a self-supporting tower.

In one of its simpler forms, a first number of the precast concrete cylinders may be provided as reinforced prestressed concrete while a second number of the precast concrete cylinders may be provided as ultra high performance fiber reinforced concrete.

Another positive aspect of one example of the present type of construction is that the precast concrete cylinders may be assembled upon a raised platform supported by a plurality of precast concrete legs, each of which may me supported on individual concrete foundation blocks positioned below local ground level.

In accordance with aspects of certain embodiments of the present subject matter, methodologies are provided to secure individual precast concrete cylinders together using adhesives.

In accordance with certain aspects of other embodiments of the present subject matter, methodologies have been developed to provide a temporary support for a raised platform.

In accordance with yet additional aspects of further embodiments of the present subject matter, apparatus and accompanying methodologies have been developed to provide an internal vertical post tensioning system within the stacked concrete cylinders to maintain structural integrity of the stacked assembly.

In accordance with yet further embodiments of the present subject matter, a ribbed concrete block structure may be provided as an alternative support for a raised tower supporting platform.

In yet still further alternative embodiments of the present subject matter, a tower supporting platform may correspond in part to a precast portion and a field poured portion.

In accordance with further embodiments of the present subject matter, a poured-in-place concrete circular strip footing may be provided requiring little or no excavation.

In accordance with aspects of certain exemplary embodiments, a conical skirt may be provided to distribute the tower load to the foundation.

In accordance with yet further aspects of certain exemplary embodiments of the present subject matter the foundation could be precast and cast monolithically with vertical stave elements.

In accordance with yet still further aspects of certain exemplary embodiments, the foundation may be configured to add additional dead load by means of external ballasts.

One exemplary embodiment of the present subject matter relates to a base structure for a support tower, comprising a ring foundation pad; a transition piece disposed above such ring foundation pad; and a plurality of staves positioned around such transition piece, each of such plurality of staves respectively comprising a top portion and a bottom portion, the bottom portion of each such stave being wider than the top portion of each such stave. In such an arrangement, preferably such bottom portion of each such stave may be respectively secured to such ring foundation pad and such top portion of each such stave may be respectively secured to such transition piece. Such plurality of staves and such transition piece may be constructed primarily of concrete.

In variations of the foregoing, such base structure may further include a plurality of anchor elements, located on such ring foundation pad, and respectively configured to secure one of such staves against radial and lateral movement. Still further, optionally, each of such plurality of anchor structures includes a receiving conduit, adapted to receive a tendon threaded through one of such plurality of staves; and each of such plurality of staves includes at least one conduit extending therethrough, with at least one tendon extending through such conduit.

In other present alternatives, such base structure may further include a central foundation pad situated within such ring foundation pad; and a tower structure supported on such central foundation pad, with such transition piece positioned on top of such tower structure. Also, such transition piece may include a plurality of facets around a perimeter thereof; and such top portion of each such stave may be configured to be respectively adhered to one of such plurality of facets. Such transition piece optionally may further define an aperture formed through a central portion thereof. In some instances, such aperture may have an elliptical shape.

In certain present variations, each of such plurality of staves may include at least one conduit extending through such stave and at least one tendon extending through such conduit. Optionally, such conduit may be a U-shaped conduit extending partially through such stave. Further, such conduit may be a U-shaped conduit comprising first and second legs connected by a horizontal portion, such first leg of such U-shaped conduit extending through a first stave of such plurality of staves and such second leg of such U-shaped conduit extending through a second stave of such plurality of staves. Such horizontal portion of such U-shaped conduit may extend across a plurality of staves.

Per present additional variations, such ring foundation pad may be constructed of a plurality of foundation sections; and such plurality of foundation sections may be secured together by a metallic strand threaded through such plurality of foundation sections.

In other present alternatives, such transition piece may comprise a central ring structure; and such base structure may be a multi-staged base structure comprising an upper transition piece disposed above such central ring structure; and a plurality of upper staves surrounding such upper transition piece, each such upper stave respectively comprising a top portion and a lower portion, the bottom portion of each such upper stave being wider than the top portion of each such upper stave, and with such lower portion of each such upper stave being secured to such central ring structure and such upper portion thereof being secured to such upper transition piece.

In some present exemplary base structure arrangements, such base structure may comprise a plurality of tubular structures stacked on top of such transition piece; and such plurality of tubular structures may be constructed primarily of concrete. In certain of such arrangements, each of such plurality of tubular structures may include a conduit extending therethrough; and such base structure may further include at least one tendon threaded through such conduit of such tubular structure and through a conduit located in one of such plurality of staves, for securing such tubular structure to such transition piece.

Another present exemplary embodiment relates to a support tower, preferably comprising a foundation; a base structure secured to such foundation; a transition piece secured to such base structure; a plurality of tubular structures stacked on top of such transition piece, each such tubular structure defining a hollow opening; such plurality of tubular structures including a topmost tubular structure having a locking mechanism; and a mast section having a bottom end and a top end inserted through such hollow openings of such plurality of stacked tubular structures, such mast section being movable between respective first and second positions thereof. In such arrangement, preferably such mast section may be configured to be secured in such second position thereof by engaging such bottom end of such mast section with such locking mechanism.

Optionally, in such arrangement, such transition piece may comprise an elliptical aperture. Further optionally, such support structure may further include a metallic plate covering such elliptical aperture, such metallic plate being removable through such elliptical aperture of such transition piece. Such metallic plate may have a plurality of standoffs extending from a top surface thereof, and such support tower may further include a lifting plate. Such lifting plate optionally may include a sealing ring around an outer perimeter thereof. In other present alternatives, such lifting plate may include a plurality of pedestals extending from such lifting plate; and such mast section may be in such first position thereof when such bottom end of such mast section may be resting on such pedestals of such lifting plate.

Per further present options, such locking mechanism of such topmost tubular structure may include an initial ring precast into such topmost tubular structure, such initial ring having a plurality of support teeth; and a toothed ring positioned above such initial ring, such toothed ring comprising a plurality of locking teeth. Still further, such bottom end of such mast section may comprise a toothed ring locking mechanism, with such toothed ring locking mechanism comprising a plurality of ring teeth; such plurality of support teeth and such plurality of locking teeth may comprise a ramped surface to provide frictional engagement with such ring teeth of such toothed ring locking mechanism; and such mast section may be in such second position thereof when such ring teeth of such toothed ring locking mechanism may be at an elevation between such support teeth and such locking teeth. Also, such mast section may be configured to be secured in such second position by rotating such mast such that such ring teeth engage such support teeth and such locking teeth.

Variations of the foregoing may include securing a wind turbine to such top end of such mast section. Such mast section may include a cylindrical steel section. Also, optionally, such transition piece, such base support, and such plurality of stacked tubular structures may be constructed primarily of concrete.

Per another exemplary embodiment of the present subject matter, a support tower may comprise a foundation having an outer perimeter defining a foundational footprint; a base structure having respective top and bottom potions, with such bottom portion thereof secured to such foundation; a transition piece associated with such top portion of such base structure such that such transition piece may be in a state of horizontal axis compression; and a mast section, having an outer perimeter defining a mast footprint smaller than such foundational footprint, and associated with such transition piece such that such transition piece may be in a state of vertical axis compression. In such arrangement, preferably such transition piece may be configured to receive poured material to fix such horizontal and vertical axes compressions thereof.

In the foregoing exemplary support tower, optional features may include providing such foundation as a ring foundation constructed primarily of concrete; and including poured concrete in such transition piece to fix such horizontal and vertical axes compressions thereof. Also optionally, such foundation may comprise a plurality of peripheral foundation pads constructed primarily of concrete; and such transition piece may include poured concrete to fix such horizontal and vertical axes compressions thereof. Such base support structure may comprise a plurality of legs, each of such legs constructed primarily of concrete, and having a first end respectively secured to such foundation and second end respectively secured to such transition piece. Alternatively, such base support structure may comprise a plurality of staves, each of such staves constructed primarily of concrete, and having a top portion and a bottom portion, the bottom portion of each such stave being wider than the top portion of each such stave, such bottom portion of each such stave being secured to such foundation and such top portion being secured to such transition piece.

Per other present variations, such mast structure may include a plurality of stacked tubular structures constructed primarily of concrete, and configured to support a wind turbine generator; and such transition piece may be constructed primarily of concrete. An exemplary such support tower may further include a plurality of post-tensioning cables, extending through such base structure and such mast structure, and circumferentially around such transition piece, and configured so as to respectively provide vertical and horizontal compressions to such transition piece.

Other variations may be practiced. For example, such support tower may further include a central foundation pad and a tower structure comprising an access ladder, and extending from such central foundation pad, such transition piece being located on top of such tower structure. Such tower structure may be constructed primarily from concrete. Such tower structure may have a cruciform cross-section, or other.

It may be to be understood by those of ordinary skill in the art from the disclosure herewith that the present subject matter equally relates to both methodology as well as apparatus subject matter. One exemplary present method relates to a method for constructing a base structure for a support tower, comprising constructing a ring foundation pad; positioning a transition piece above such ring foundation pad; positioning a plurality of staves around such transition piece, each of such plurality of staves respectively comprising a top portion and a bottom portion, such bottom portion of each such stave being wider than such top portion thereof; respectively securing such bottom portion of each of such plurality of staves to such ring foundation pad; and respectively securing such top portion of each of such plurality of staves to such transition piece. In some of such exemplary practices, such plurality of staves and such transition piece may be constructed primarily of concrete.

Per other present alternatives, such method may optionally further include constructing a central foundation pad situated within such ring foundation pad; supporting a tower structure on such central foundation pad; and positioning such transition piece on top of such tower structure. Alternatively, such method may even further include removing such tower structure after such plurality of staves have been secured to such transition piece.

Per other present variations, such method may further include providing such transition piece with a plurality of facets defined about a perimeter thereof; and respectively securing such top portion of each such stave to respective facets defined on the perimeter of such transition piece. Also, such transition piece may further define an aperture formed through a central portion thereof. In some instances, such aperture may have an elliptical shape.

In other present variations, such method may further include selectively including conduits in such plurality of staves; extending at least one tendon through a conduit disposed in one of such plurality of staves; and applying tension to such at least one tendon to secure such stave to such base structure. Such conduit may extend through the length of such stave. Such conduit may be a U-shaped conduit extending partially through the length of such stave. Still further, such conduit may comprise a U-shaped conduit having respective first and second legs connected by a horizontal portion, wherein such first leg extends through a first stave of such plurality of staves and such second leg extends through a second stave of such plurality of staves.

Per present alternatives, such step of constructing a ring foundation pad may include providing a plurality of foundation sections; placing such plurality of foundation sections together to form such ring foundation pad; and threading a metallic stand through such plurality of foundation sections to secure such plurality of foundation sections together. In some instances, such method may further include providing a plurality of anchor elements located on such ring foundation pad; and respectively securing such bottom portion of each such stave to one of such plurality of anchor elements on such ring foundation pad, for securing such plurality of staves against radial and lateral movement. Still further may be included threading at least one tendon through one of such plurality of staves; threading such tendon through a receiving conduit of such anchor structure; and applying tension to such tendon to secure such stave to such anchor structure.

The subject method may practice alternative arrangements per present subject matter. For example, such transition piece may comprise a central ring structure; and such method may further include constructing a multi-staged base-structure by positioning an upper transition piece above such central ring structure; positioning a plurality of upper staves around such upper transition piece, each of such plurality of upper staves respectively comprising a top portion and a bottom portion, with such bottom portion of each such upper stave being wider than such top portion thereof; securing such bottom portion of each of such plurality of upper staves to such central ring structure; and securing such top portion of each of such plurality of staves to such upper transition piece.

Present methodology optionally may further include stacking on top of such transition piece a plurality of tubular structures constructed primarily of concrete. Also, such method optionally may further include providing a conduit respectively extending through each of such plurality of tubular structures; threading at least one tendon through such conduit of such tubular structure; threading such tendon through one of such plurality of staves; and applying tension to such tendon to secure such tubular structure to such base structure.

Additional exemplary embodiments of the present subject matter may relate to a method for constructing a support tower; such method comprising providing a foundation; securing a base structure to such foundation; placing a transition piece on such base structure; stacking a plurality of tubular structures on top of such transition piece, each such plurality of tubular structures defining a hollow opening, such plurality of stacked tubular structures including a topmost tubular structure having a locking mechanism; inserting a mast section having respective bottom and top ends through such hollow openings of such plurality of stacked tubular structures such that such bottom end of such mast section may be adjacent such transition piece; raising such mast section such that such bottom end of such mast section may be adjacent such locking mechanism of such topmost tubular structure; and engaging such bottom end of such mast section with such locking mechanism.

Per present variations of the foregoing, such support tower may include a lifting plate, and such lifting plate may include a sealing ring around an outer perimeter thereof. Also, optionally, such lifting plate may comprise a plurality of pedestals extending from such lifting plate. Such step of inserting such mast section may comprise inserting such mast section through such hollow openings of such plurality of stacked tubular structures such that such bottom end of such mast section rests on top of such pedestals extending from such lifting plate. Such step of raising such mast section may comprise forcing compressed air into a space defined between such plurality of stacked tubular structures and such lifting plate.

Also, optionally, such locking mechanism of such topmost tubular structure may comprise an initial ring precast into such topmost tubular structure, such initial ring comprising a plurality of support teeth; and a toothed ring comprising a plurality of locking teeth. Such bottom end of such mast section may comprise a toothed ring locking mechanism, such toothed ring locking mechanism comprising a plurality of ring teeth. Such plurality of support teeth and such plurality of locking teeth may comprise a ramped surface to provide frictional engagement with such ring teeth of such toothed ring locking mechanism. Such step of engaging such bottom end of such mast section with such locking mechanism may comprise rotating such mast section such that such ring teeth may be positioned between such support teeth and such locking teeth.

Variations of present methodology may further include removing such compressed air after such lower end of such mast section has been engaged with such locking mechanism. Variations may further include providing an elliptical aperture in such transition piece, and removing such lifting plate through such elliptical aperture. Such present method optionally may further include mounting a wind turbine to such top end of such mast section, which mast section in certain arrangements may comprise a cylindrical steel section.

In other present options, such transition piece, such base support, and such plurality of stacked tubular structures may be constructed primarily of concrete. Also, variations of the present method may further include disengaging such bottom end of such mast section from such locking mechanism; and lowering such mast section such that such mast section may be adjacent such transition piece. Such step of lowering such mast section comprises using compressed air to control the rate at which such mast section may be lowered.

Another exemplary embodiment of a present method for constructing a support tower may comprise constructing a foundation, such foundation having an outer perimeter defining a foundational footprint; providing a base structure having respective top and bottom portions, with such bottom portion thereof secured to such foundation; providing a mast section having an outer perimeter defining a mast footprint that may be smaller than such foundational footprint; associating a transition piece with the top portion of such base structure such that such transition piece may be placed in a state of horizontal axis compression; associating such mast section with such transition piece such that such transition piece may be placed in a state of vertical axis compression; and pouring material in such transition piece to fix such horizontal and vertical compression thereof, such that the transition piece may be associated with both such base structure and such mast section while being held in biaxial compression.

In the foregoing exemplary method, optionally such foundation may be a ring foundation constructed primarily of concrete, or such foundation may comprise a plurality of peripheral foundation pads constructed primarily of concrete. Such step of associating such transition piece with the top portion of such base structure may include positioning a plurality of legs around such transition piece, each of such plurality of legs constructed primarily of concrete, and respectively having a first end and a second end; securing such first end of each of such plurality of legs to such foundation; and securing such second end of each of such plurality of legs to such transition piece.

Optionally, still further, such step of associating such transition piece with the top portion of such base structure may include positioning a plurality of staves around such transition piece, each of such staves constructed primarily of concrete, and having a top portion and a bottom portion, the bottom portion of each such stave being wider than the top portion of each such stave; securing such bottom portion of each such stave to such foundation; and securing such top portion of each such stave to such transition piece.

Also, such transition piece may be constructed primarily of concrete; and such step of associating such mast section with such transition piece may include stacking a plurality of tubular structures constructed primarily of concrete on top of such transition piece, with such mast configured to support a wind turbine generator. Variations of such method may further include extending a plurality of post-tensioning cables through such base structure and such mast section; extending a plurality of post-tensioning cables circumferentially around such transition piece; and tensioning such plurality of post-tensioning cables so as to respectively provide horizontal and vertical axes compression to such transition piece.

Still other present alternatives may include constructing a central foundation pad; extending a tower structure from such central foundation pad; placing such transition piece on top of such tower structure; and removing such tower structure after such transition piece may be secured to such base structure. Alternatively, such tower structure may be constructed primarily of concrete, and/or such tower structure may have a cruciform cross-section or other. Per yet other present variations, the present method may further comprise constructing a central foundation pad; extending a tower structure from such central foundation pad, such tower structure having an access ladder; and placing such transition piece on top of such tower structure.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 illustrates an exemplary embodiment of a concrete base support, such as for a windmill, in accordance with the present technology, fully installed and supporting a representative exemplary windmill;

FIG. 2 illustrates an enlarged portion of a lower section of the concrete base support exemplary embodiment of present FIG. 1, illustrating a temporary support tower and guy wires;

FIG. 3 illustrates an enlarged portion of a lower section of the concrete base support of present FIG. 1, illustrating lateral support structure for the concrete base support legs;

FIG. 6 illustrates an exemplary embodiment of an alternate concrete base support, such as for a windmill, in accordance with a further embodiment of the present technology;

FIG. 7 illustrates an interior view of the base portion of the exemplary base support of FIG. 6 illustrating interior integral concrete rib construction in accordance with the present technology, seen generally as from view line 7-7 of present FIG. 6;

FIG. 8 is an enlarged view of a further alternative concrete base support in accordance with a yet further embodiment of the present technology;

FIG. 31 illustrates a completed tower construction supporting a wind generator but omitting the normally accompanying turbine blade assembly;

FIG. 32 is a cross section of a portion of a precast base including ballast-fill and stave anchoring features in accordance with certain exemplary embodiments of the present technology;

FIG. 33 illustrates a cross section of an alternate configuration of the precast base structure that is identical to that of FIG. 32 except that the upstanding wall section has been replaced with a separated corrugated metal structure in accordance with certain other exemplary embodiments of the present technology;

Figure 4:
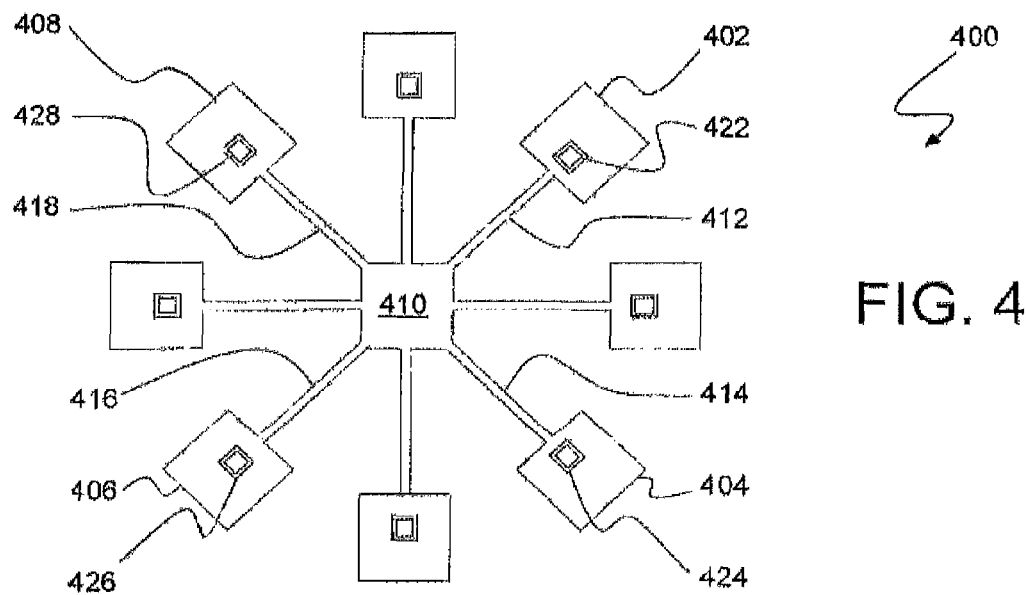
FIG. 4 illustrates an exemplary present foundation plan for an exemplary concrete base support in accordance with present technology.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with apparatus and corresponding methodology for providing base supports, such as comprised at least in part of precast concrete, and such as for windmills and wind-driven power generators, or other apparatuses.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject concrete base support, shown for example, in support of representative exemplary windmills. With reference to the drawings, FIG. 1 illustrates an exemplary embodiment of a concrete base support generally 100, such as for a windmill, in accordance with the present technology, illustrated as fully installed and supporting a representative generator generally 120 and accompanying turbine blade assembly generally 122. Those of ordinary skill in the art will appreciate that particular internal details regarding such generator 120 and turbine blade assembly 122 form no particular aspects of the present subject matter, wherefore further additional detailed discussion of such devices is not required for a complete understanding of the present subject matter.

Concrete base support 100 corresponds to a number or plurality of sections, all of which are made of concrete in various forms, so as to provide particular capabilities as required for desired support of generator 120 and turbine blade assembly 122.

As may be seen from FIG. 1, concrete base support 100 corresponds to a leg section comprising, in an exemplary configuration, such as eight legs representatively illustrated by leg 114. Various numbers of legs may be practiced in accordance with the present subject matter. Each of such legs 114 rests on an individual foundation block generally 116, as is described more fully hereinbelow with reference to present FIG. 4. Further, each such leg generally 114 is preferably inserted into one of a corresponding number of mating holes 117 in a platform 112. In an exemplary configuration, platform 112 may be constructed of reinforced concrete, may be circular in shape, may have a diameter of twenty six feet and may be four feet thick. Each leg 114 may measure four feet by four feet and have eight inch thick walls. The leg portion is assembled with the assistance of temporary structure, as is described hereinbelow with reference to FIG. 2.

Portions 102, 104, 106, and 108 of concrete base support 100 preferably vary in size as illustrated in and represented by FIG. 1, and also preferably are constructed with varying concrete compositions. Portion 102 of concrete base support 100 corresponds to a number of stacked reinforced prestressed concrete cylinders representatively illustrated as cylinders 132, 134, 146. Each cylinder 132, 134, 136 may also include reinforcing bars (rebars), for example, common steel bar, as is commonly used in reinforced concrete. Further, it should be noted that while the present description may speak of concrete cylinders, such description does not necessarily mean that the outer and/or inner shape is circular. In fact the concrete cylinders constructed in accordance with the present technology may correspond to cylindrical, octagonal, hexagonal, or any other outside and/or inside surface formation or combinations thereof.

Each of the concrete cylinders 132, 134, 136 in section 102 of concrete base support generally 100 preferably is substantially the same size and similarly constructed of reinforced prestressed concrete. Each of such cylinders also is preferably constructed for mating assembly such that the top of one cylinder is shaped to mate with the bottom of the next, i.e., adjacent, cylinder. As the cylinders 132, 134, 136 are stacked, each preferably is adhesively secured together using, for example, an epoxy or grout. In an exemplary configuration, twenty cylinders may be stacked together to form section 102 of concrete base support 100 where each cylinder 132, 134, 136 may be six feet tall thereby producing a section 102 which is one hundred twenty feet tall.

Following assembly of section 102 of concrete base support 100, a transition ring or cylinder 104 is placed on the top cylinder of portion 102. As may be seen from the representations of present FIG. 1, such transition cylinder 104 preferably varies in diameter from a diameter corresponding to the diameter of section 102 to a smaller diameter matching the diameter of the cylinders forming section 106. In an exemplary configuration, transition cylinder 104 may have a midpoint diameter of thirteen feet and have an eighteen inch thick wall. Transition cylinder 104 as well as each of the cylinders in portion 106 of concrete base support 100 representatively illustrated as cylinders 142, 144, 146 are formed of ultra high performance fiber reinforced concrete. In an exemplary configuration, the ultra high performance fiber reinforced concrete may employ steel fiber as the fiber component of the concrete. In other embodiments, other fibers comprise of other materials, now known or later-developed, may be utilized.

As previously referenced, each cylinder of section 106, representatively illustrated as cylinders 142, 144, 146, of concrete base support generally 100 is constructed from ultra high performance fiber reinforced concrete and may employ steel fiber for reinforcement. In an exemplary configuration, seven cylinders each fifteen feet tall may be stacked to produce a section 106 which is one hundred five feet tall.

Following assembly of section 106 of concrete base support 100, an additional cylinder 108 preferably is affixed to the top most cylinder of portion 106. Top most cylinder 108 has a bottom portion configured to mate with the top cylinder of portion 106 and a top surface that provides a mounting surface for representative generator 120. In addition, there is provided an anchoring ring to secure one end of a post tensioning cable assembly that extends per the present subject matter from such anchoring ring to a corresponding anchor at platform 112.

Once each of the various cylinders have been stacked and respectively glued into place, a cable 110 is passed through the hollow center of each of the stacked cylinders, secured at the anchor ring at the top of the string and at the anchor associated with platform 112 (i.e., at the bottom of the string) and tightened, thereby providing an internal vertical post tensioning system to assist in securing each of the respective cylinders.

With reference to present FIG. 2, there is illustrated an enlarged portion of a lower section generally 200 of the concrete base support 100 illustrating a temporary support tower 210 and guy wires 224, 226 employed to support platform 112 during assembly of the concrete base support 100. As may be seen from such FIG. 2, temporary tower 210 rests on its own foundation blocks, representatively illustrated as blocks 222 and 224, and which may be placed below grade along with tower leg 114 support blocks, representatively 116. Further, guy wires 224, 226 may be secured to foundation blocks 116 and to the top of temporary tower 210 for added stability. Those of ordinary skill in the art will appreciate from the disclosure herewith that the components variously referenced herein as "temporary" are intended to be removed once the remainder of the presently described structure is assembled at a designated area. On the other hand, certain "temporary" components may be at least partially retained. For example, tower 210, or portions thereof, might be retained to facilitate access to the upper portions of an erected tower and to serve as support structure for power lines, for example, coupled to the generator 120 or other items requiring physical support.

With reference to FIG. 3, there is illustrated an enlarged portion of a lower section 200 of the concrete base support 100 illustrating lateral support structure 302 for the concrete base support legs 114. Lateral support structure 302 may be constructed of reinforced concrete or steel and may be secured to legs 114 in any suitable manner.

With reference to FIG. 4, there is illustrated an exemplary foundation plan 400 for the concrete base support 100 in accordance with present technology. As illustrated in FIG. 4, eight foundation pads, representatively pads 402, 404, 406, 408 may be provided. Each of the pads 402, 404, 406, 408 is coupled to a central pad 410 by way of tension tie members 412, 414, 416, 418. Coupling pads 402, 404, 406 and 408 to central pad 410 enhances the stability of the foundation plan 400. Leg engaging supports representatively illustrated as supports 422, 424, 426, 428 are associated with each foundation pad 402, 404, 406, 408. In an exemplary configuration, pads 402, 404, 406, 408, 410 may each correspond to fifteen by fifteen foot concrete block each three feet thick. Tensioning tie members 412, 414, 416, 418 may each correspond to eighteen inch by eighteen inch concrete sections. Tensioning tie members 412, 414, 416, and 418 may also include a metallic tendon extending through the tensioning tie members 412, 414, 416, and 418 for further support.

Figure 5:
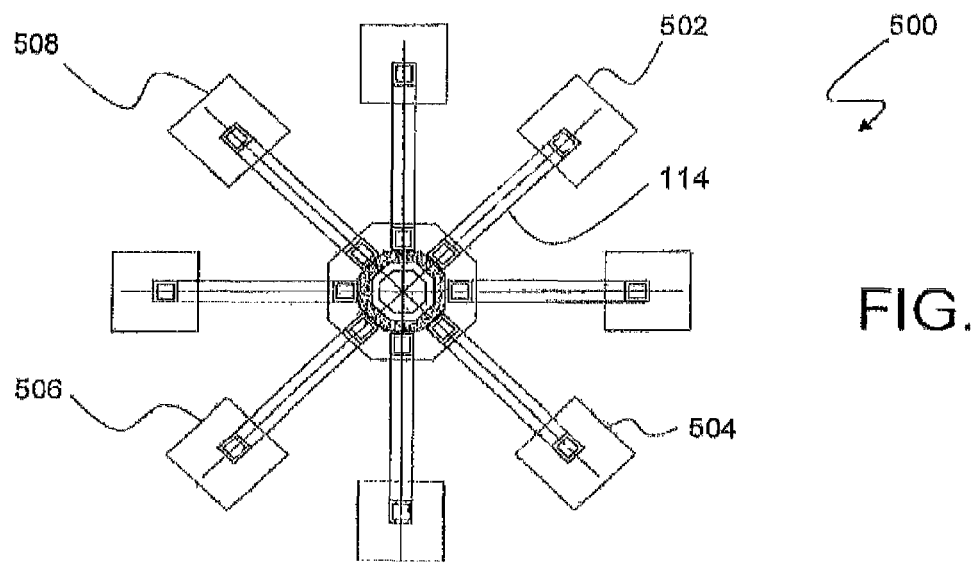
FIG. 5 represents a cross-section view of the exemplary concrete base support legs of the present subject matter, taken along section line 5-5 of FIG. 1.

With reference now to FIG. 5, there is illustrated a cross-section view of the concrete base support legs 114 taken along section line 5-5 of FIG. 1. Also visible are the eight foundation pads representatively illustrated as pads 502, 504, 506, 508.

Referring now to FIGS. 6 and 7, an exemplary embodiment of an alternative concrete base support features 610, such as for a windmill, in accordance with a further embodiments of the present technology and employing ribbed concrete panel construction is described. As may be seen in FIG. 6, a concrete base and tower structure generally 600 may be constructed by supporting pre-formed concrete blocks representatively illustrated as blocks 620 cast with integral ribs 704 (see FIG. 7). Elements 702 represent concentric elements of support which are achieved with such present exemplary embodiment.

A generally circular concrete foundation 622 replaces the plurality of concrete pads 402, 404, 406, 408; 502, 504, 506, 508 illustrated in the embodiment represented in FIGS. 4 and 5, and support a steel skeletal structure over which a plurality of blocks 620 are placed. The exemplary base 610 thus formed supports a tower section composed of a plurality of generally circular sections 630, 632 stacked upon each other and all supported by base 610.

With reference to present FIG. 8 there is illustrated an enlarged view of a further alternative concrete base support generally 800 in accordance with a yet further exemplary embodiment of the present technology. Concrete base support 800 provides a series of respective legs 814 (in this instance, eight such legs) each resting at one end thereof on a circular concrete foundation 816. The other end of each of such exemplary eight legs 814 supports exemplary platform 812, which then in turn supports a representative tower section generally 820. Also, intermediate respective brace supports, generally 818, may be provided between respective legs 814, as illustrated. It should be appreciated that while eight legs are illustrated, such number of legs is an exemplary representation of the present embodiment, and such number of legs may vary as required based on particular needs related to tower support requirements.

Figure 9:
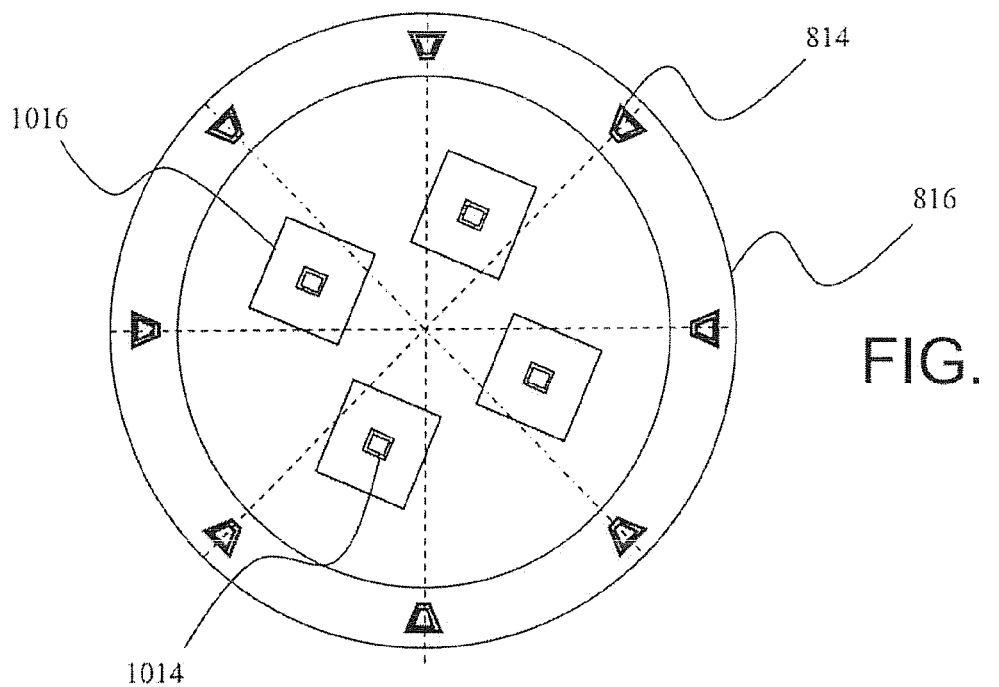
FIG. 9 is a view similar to that of present FIG. 4, and illustrates an exemplary present foundation plan for a further exemplary concrete base support in accordance with present technology.
Figure 10:
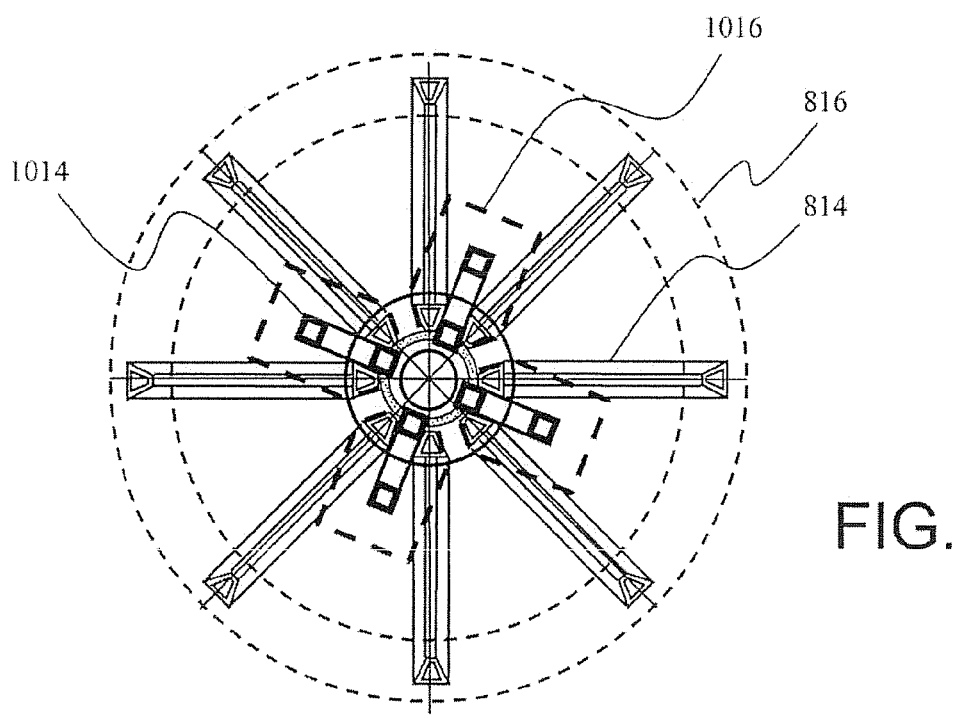
FIG. 10 is a view similar to that of present FIG. 5, and represents a cross-section view of yet further exemplary concrete base support legs in accordance with the present technology.

In addition to the eight legs 814 illustrated in FIG. 8, additional legs centrally positioned with respect to the illustrated legs 814 may also be provided but are not illustrated in FIG. 8, simply in order to avoid unnecessary clutter in the drawing. The positioning of such legs may be seen, however, from FIGS. 9 and 10, and in particular from FIG. 10, where both legs 814 and a group of four centrally located legs 1014 are illustrated. Also illustrated in FIGS. 9 and 10 are additional concrete pads 1016 positioned to support centrally located legs 1014. As with legs 814, it should be appreciated that the number of centrally positioned legs may vary from that illustrated to accommodate particular tower support requirements for a given embodiment of the present subject matter.

Figure 12:
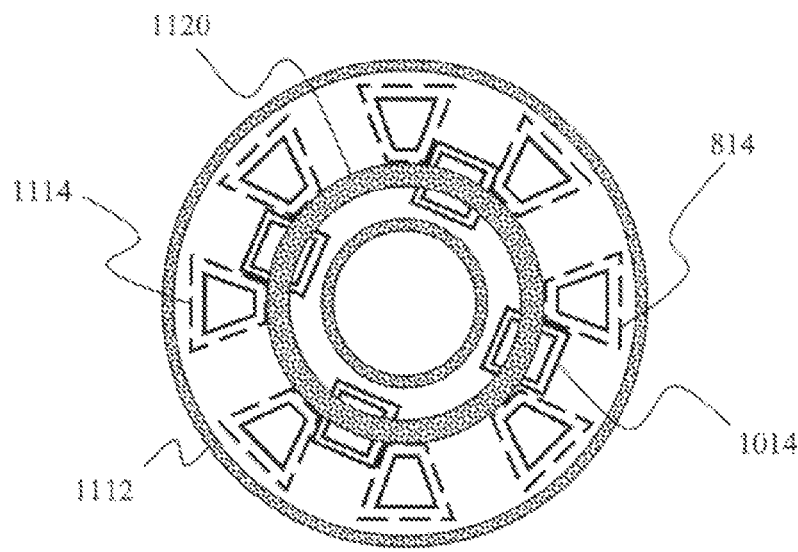
FIG. 12 is a top view of the exemplary platform of FIG. 11 taken along view line 12-12 of FIG. 11.
Figure 11:
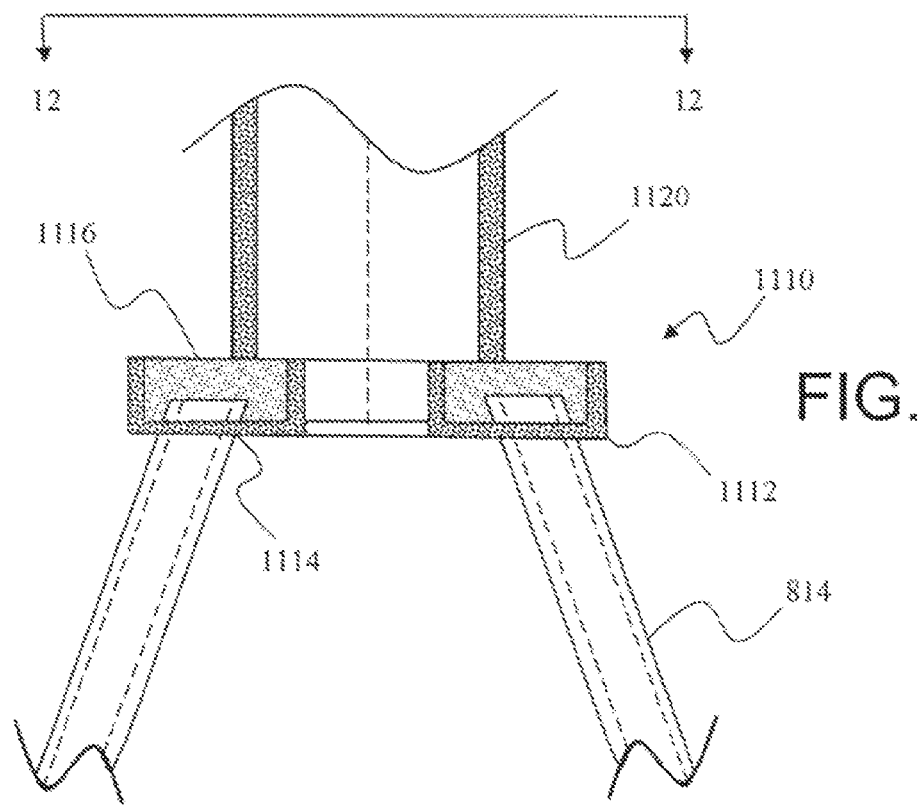
FIG. 11 is a partial, generally side view of an exemplary concrete platform in accordance with another exemplary embodiment of the present technology.

With reference to FIGS. 11 and 12, there is illustrated an exemplary representative platform 1110 configured so as to be supported by the previously illustrated legs 814 and 1014, and so as to support thereon precast concrete tubular tower sections representatively illustrated as section 1120. Platform 1110 generally corresponds to a precast portion 1112 having a generally U-shaped cross section and including a number of precast column penetrations 1114 provided for insertion of legs 814, 1014. In one exemplary configuration, precast platform 1110 may have, for example, an overall diameter of 26 feet, a height of 4 feet, and a central open aperture (unnumbered) of 8 feet. Those of ordinary skill in the art will appreciate that such dimensions are exemplary dimensions only and may vary depending of particular tower support requirements of a given embodiment.

Platform 1110, when completed during assembly of the tower structure, also corresponds to a quantity of field poured concrete elements 1116, which fill the precast portion 1112, secure legs 814, 1014 in position, and function as a support for precast concrete tubular tower sections 1120.

Figure 13:
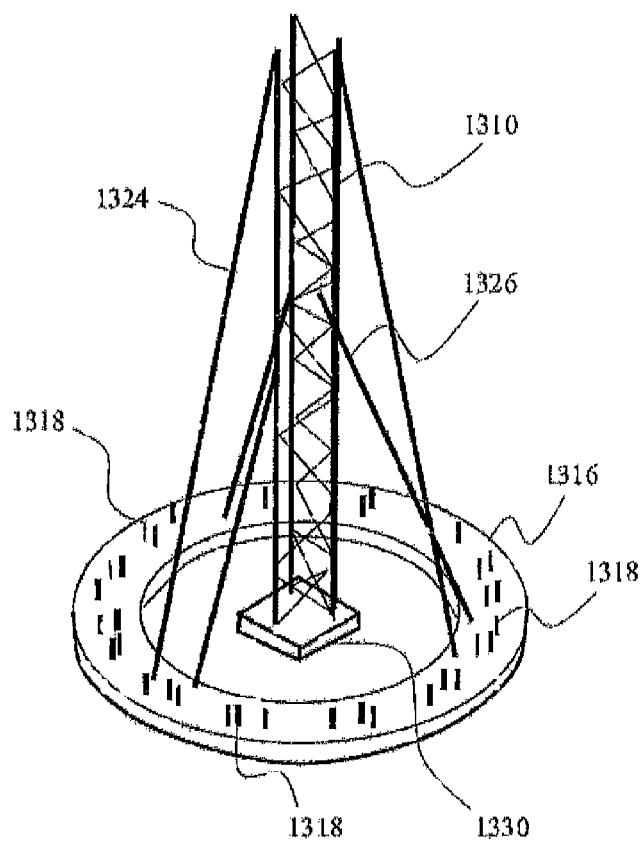
FIG. 13 illustrates a portion of a lower section of the concrete base support in accordance with a further exemplary embodiment of present subject matter, illustrating a temporary support tower, guy wires, and circular concrete base support.

With reference now to FIGS. 13-31, a further exemplary embodiment of the present base support for wind-driven power generators will be described. As may be seen in FIG. 13, a concrete base support and temporary tower construction may be seen that is similar, in many respects, to the previously described embodiment. As illustrated in FIG. 13, there is provided a concrete base 1316 including embedded therein a number of anchor elements 1318. Concrete base 1316 may be poured in place and requires minimal or nor excavation. In an exemplary configuration, concrete base 1316 may be sixty feet in diameter and may be provided as a shallow foundation extending just below the frost line, perhaps two to three feet in depth.

A second concrete base support 1330 may be rectangular and centrally positioned within an open space within the circular concrete base 1316. Concrete base support 1330 is large enough to provide support for temporary tower 1310 which may be held in position by one or more guy wires 1324, 1326. It should be appreciated that while the present construction permits removal of tower 1310, such tower may, nevertheless, be retained for other purposes including providing support for conductive cables associated with the wind generator, for access to the central portion of the rower above transition piece 1412 or for other purposes not directly related to the tower construction.

Figure 14:
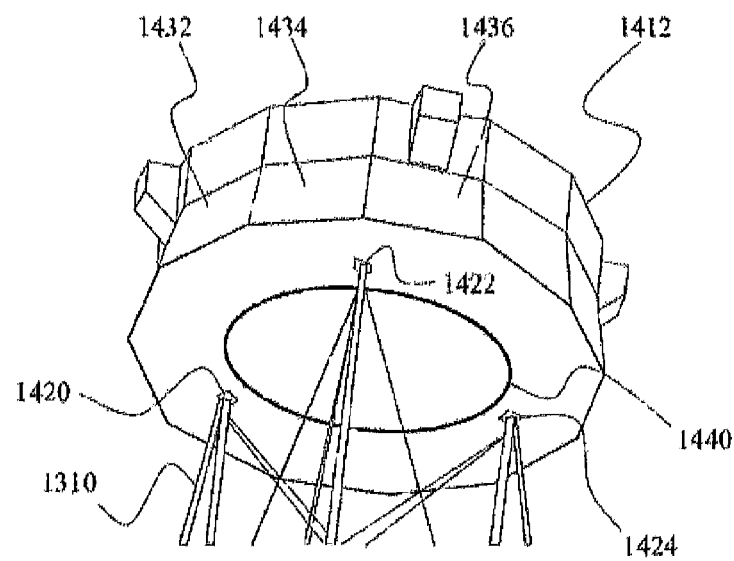
FIG. 14 is an enlarge perspective view of the top portion of the temporary tower illustrated in FIG. 13 with a precast concrete transition piece placed thereon.

Referring now to FIG. 14, there is seen an enlarge perspective view of the top portion of temporary tower 1310 illustrated in FIG. 14 with a precast concrete transition piece 1412 placed thereon. Transition piece 1412 may be raised into position using a crane or other suitable mechanisms and is placed on flat pads 1420, 1422, 1424 secured to the tops of vertical sections of tower 1310. Transition piece 1412 simple sits in place in is more securely positioned by placement of staves and other securing devices as will be explained more fully later.

Transition piece 1412 is constructed with as a multifaceted precast concrete construction to include a number of facets 1432, 1434, 1436, where the number of facets is equal to the number of staves to be positioned about the perimeter of the transition piece 1412. It should further be noticed that an elliptical aperture 1440 is provided through the central portion of transition piece 1412 and provides a passage way through transition piece 1412. Elliptical aperture 1440 provides for the removal of an elongated sealing plate as will be more fully described later.

Figure 15:
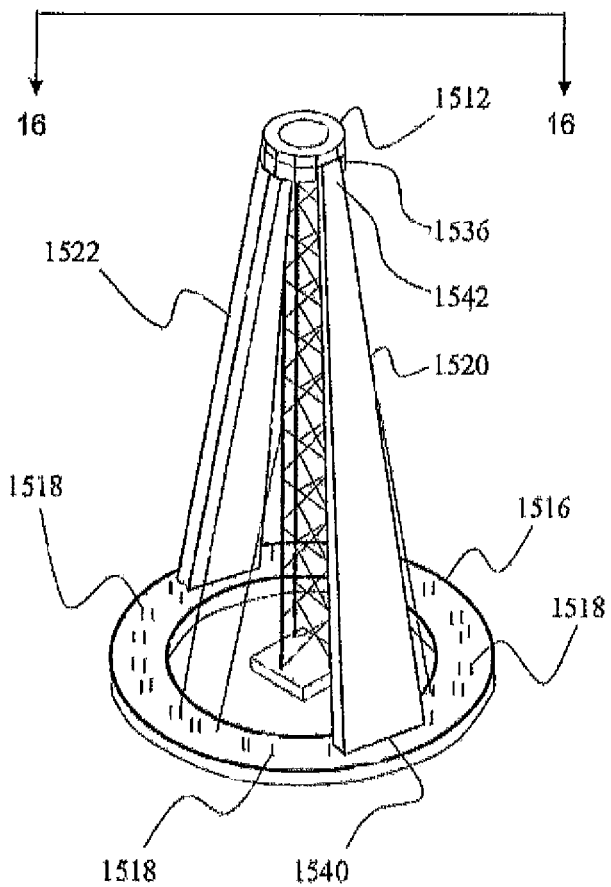
FIG. 15 illustrates the placement of a first pair of staves positioned in balanced relationship on opposite sides of the transition piece.
Figure 16:
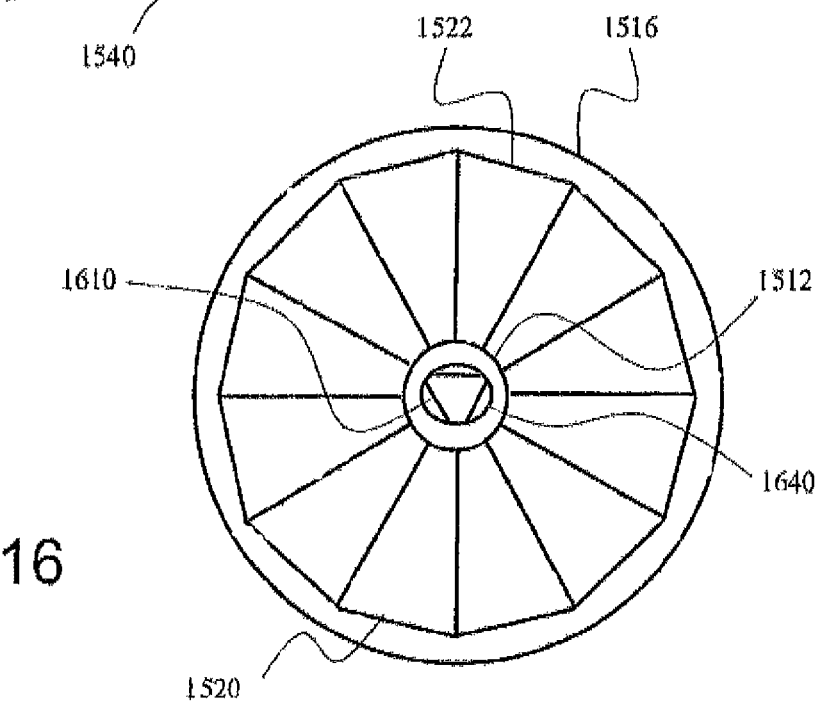
FIG. 16 is a top view taken from line 16-16 of FIG. 15 showing a completed skirted base structure.

With reference now to FIGS. 15 and 16, it will be seen that a number of pairs of staves 1520, 1522 are positioned with a wider base portion 1540 resting on concrete base 1516 and a narrower top portion 1542 simply leaning against a correspondingly sized facet 1536 of transition piece 1512. Base portion 1540 may be secure against radial and lateral movement by attachment to one or more anchor elements 1518. FIG. 16 illustrates a top view taken from line 16-16 of FIG. 15 showing a completed skirted base structure including concrete base 1516, plural pairs of staves 1520, 1522 positioned at top portions thereof in contact with facets of transition piece 1512. Also illustrated is elliptical aperture 1640 exposing portions of temporary tower 1610.

Figure 17:
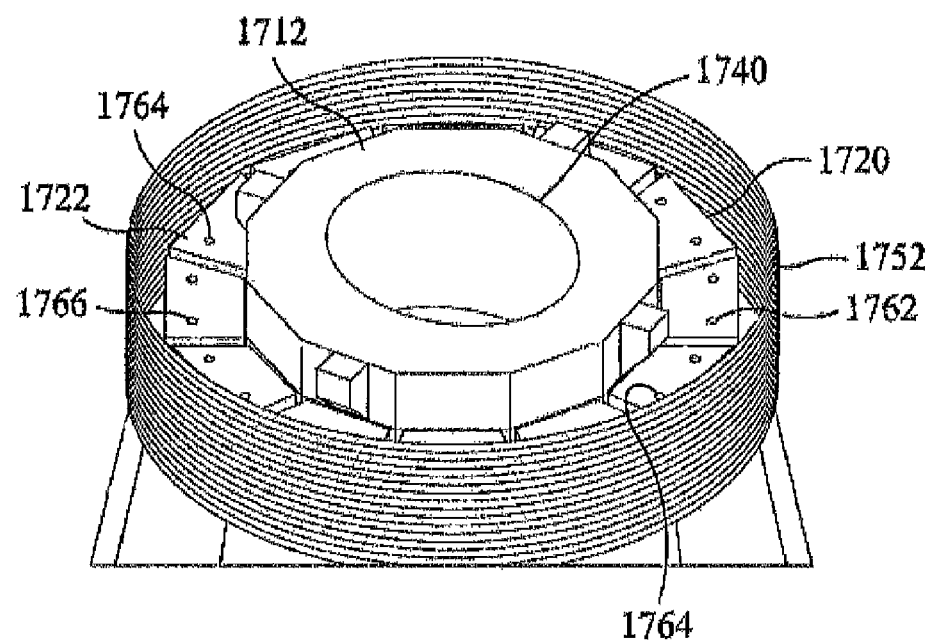
FIG. 17 illustrates a top perspective view of the precast transition piece with all stays in place and banded around with a corrugated metal collar.
Figure 34:
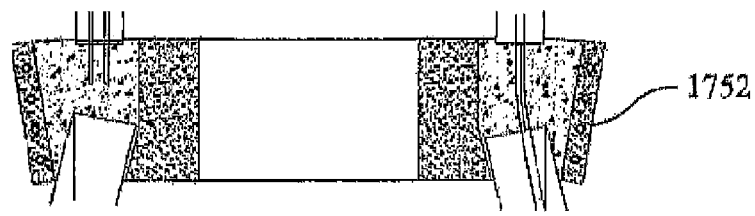
FIG. 34 illustrates in cross section an alternate arrangement for forming the transition piece using a precast concrete collar.

FIG. 17 illustrates a top perspective view of the precast transition piece 1712 with all staves 1720, 1722 in place and banded around with a corrugated metal collar 1752. In an alternative configuration, corrugated metal collar 1752 may be replaced with a precast concrete collar 1752' as illustrated in FIG. 34. Elliptical aperture 1740 is also illustrated providing a passageway through transition piece 1712. A number of additional feature of transition piece 1712 are more clearly illustrated in FIG. 17 including a number of conduits 1762, 1764, 1766, 1768, the ends of which may be seen exposed on the ends of staves 1720, 1722. Conduits 1762, 1764, 1766, 1768 extend, in certain embodiments, through the length of staves 1720, 1722. In certain other embodiments, conduits 1762, 1764, 1766, 1768 may extend only a certain way down the length of staves 1720, 1722 to then turn and join with other conduits to form a U-shaped conduit from the top portion the individual stave to emerge as separate legs of the U-shape in the same or, possibly adjacent stave. In assembled form, the conduits provide a passage way for a metallic strand that may be threaded through the conduits to provide strengthened assembly of the various tower components. As will be explained further later, the metallic strands may be extended through further conduits provided in further tower portions to further assist in securing the tower components together.

Figure 18:
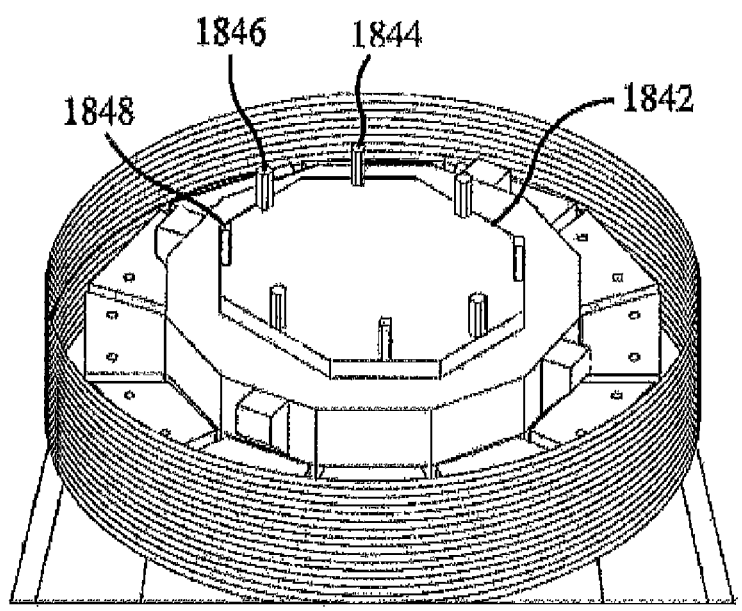
FIG. 18 illustrates a view similar to that of FIG. 17 but including a sealing plate that forms a portion of a tower hydraulic lifting mechanism.

Referring to FIG. 18, it will be noticed that the illustration is substantially identical to that of FIG. 17 with the addition of a metallic plate 1842 covering elliptical aperture 1740 (FIG. 17). Metallic plate 1842 may be constructed of steel and has provided on the top portion thereof a number of standoffs 1844, 1846, 1848 that are provided as support for a lifting plate to be described later. It should be noticed that metallic plate 1842 is constructed to have a length and a width such that the width is narrower than the longer length of the elliptical aperture 1740 yet the width is wider than the narrower width of the elliptical aperture 1740. In this way, metallic plate 1842 may be turned so that it will pass through elliptical aperture 1740 for removal as an optional final portion of the tower erection process.

Figure 19:
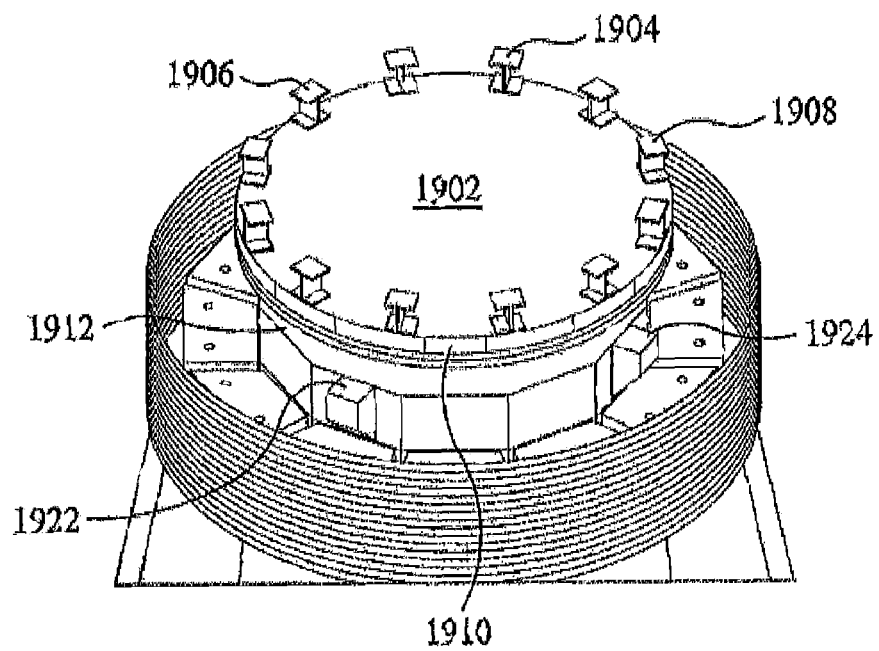
FIG. 19 illustrates a view similar to that of FIG. 18 but including a tower lifting plate.

FIG. 19 illustrates a view similar to that of FIG. 18 and further illustrates a tower lifting plate 1902. Positioned around the perimeter of lifting plate 1902 are a number of pedestals 1904, 1906, 1908. Pedestals 1904, 1906, 1908 generally correspond to portions of an I-beam and include a flat top surface configured to interface with end edge of a steel cylindrical tower portion and to lift the steel cylindrical tower portion in place using air pressure as will be described more fully later. In conjunction with the object of lifting the steel cylindrical tower portion using air pressure, a sealing ring 1910 is provided around the outer perimeter of lifting plate 1902 that functions in combination with the inner surface of one or more precast concrete tower sections to provide a substantially air tight seal.

Figure 20:
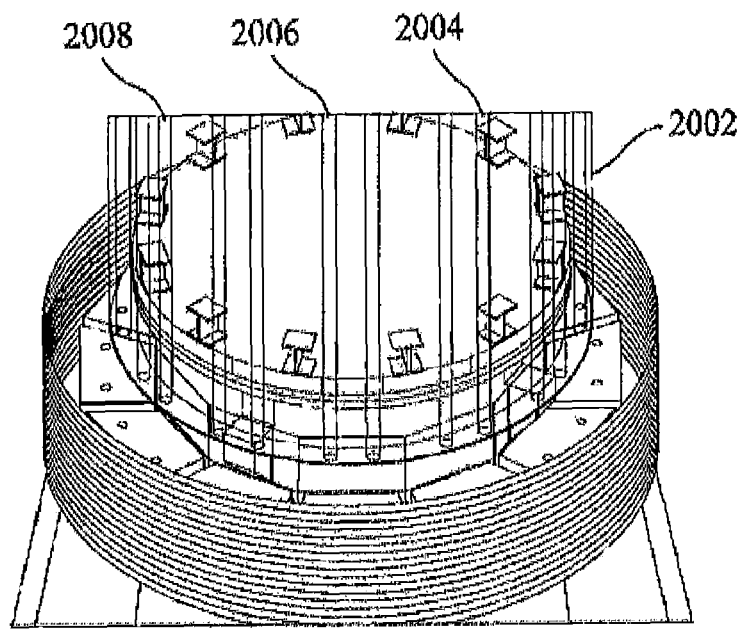
FIG. 20 illustrates a view similar to that of FIG. 19 and including illustration of a first precast concrete tower section shown partially in phantom to better illustrate aspects of the internal construction.

With reference to FIG. 20, there is illustrated a view similar to that of FIG. 19 and further illustrating a first precast concrete tower section 2002 shown partially in phantom to better illustrate aspects of the internal construction. As will be noticed from FIG. 20, there are a number of conduits 2004, 2006, 2008 provided within the wall of the precast concrete tower section 2002. Conduits 2004, 2006, 2008 are positioned to cooperate with conduits 1762, 1764, 1766, 1768 incorporated into staves 1720, 1722 (FIG. 17) and provide guides through which metallic threads may be passed to assist in securing the various tower components together. As may be seen most clearly in FIG. 20, precast concrete tower portion 2002 is sized to fit over lifting plate 1902 and is supported in place by a number of corbels or support blocks 1922, 1924 integrally incorporated into transition piece 1912 and radially extending from the perimeter thereof, as best seen in FIG. 19.

Figure 21:
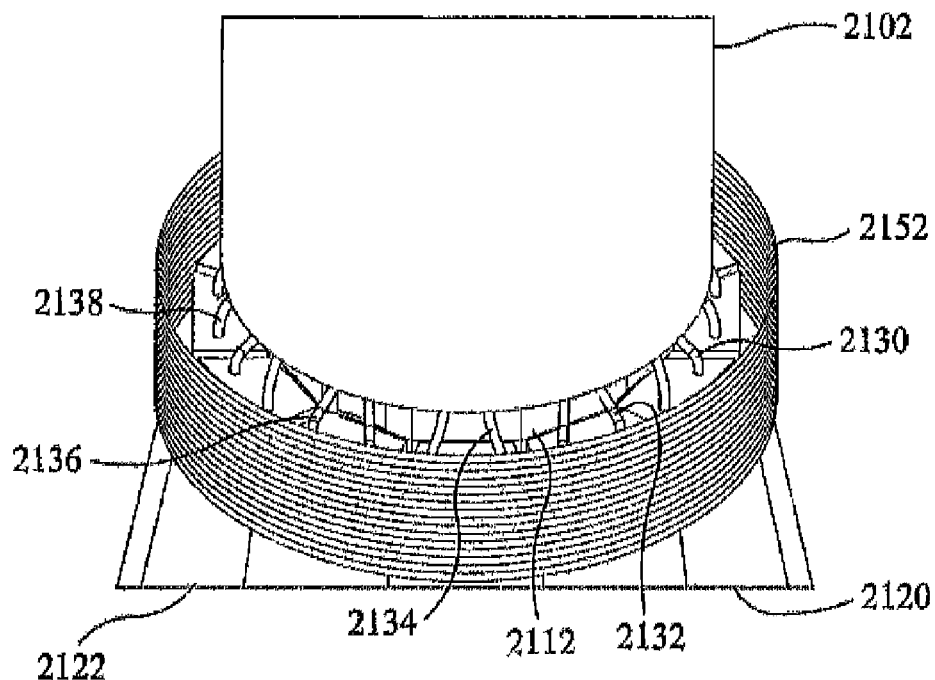
FIG. 21 illustrates coupling of ducts within the stays and precast concrete tower section to provide passageways for securing strands.
Figure 22:
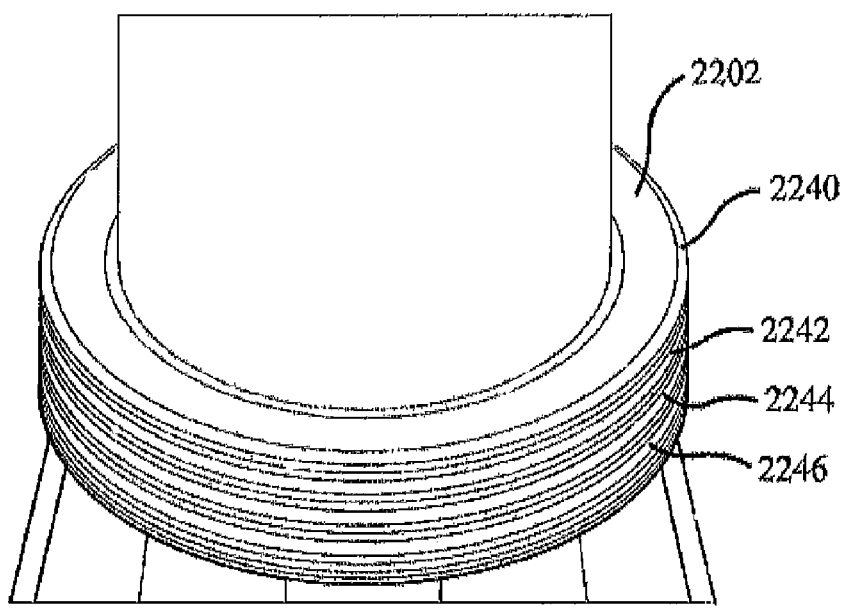
FIG. 22 illustrates sealing and circumferential clamping of the joint between the first section of precast concrete tower portion and the precast transition piece.

With reference now to FIG. 21 there is illustrated a first precast concrete tower section 2102 sitting in place on top of transition piece 2112. Coupling ducts 2130, 2132, 2134, 2136, 2138 are installed to couple ducts within the staves 2120, 2122 and precast concrete tower section 2102 to provide passageways for securing metallic strands. Referring now to FIG. 22, it will be seen that following placement of coupling ducts 2130, 2132, 2134, 2136, 2138, the space enclosed by corrugated metal band 2152 (FIG. 21) is filled with concrete 2202 and surrounded by a number of circumferential clamps 2240, 2242, 2244, 2246 configured to place the poured concrete filled corrugated metal band 2152 in compression.

Figure 23:
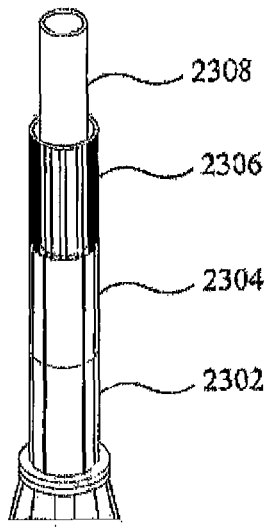
FIG. 23 illustrates, partially in phantom, the stacking of additional precast concrete tower sections and the insertion into the stacked concrete sections of a steel tower section.

With reference now to FIG. 23, it will be seen that a number of precast concrete cylindrical tower sections 2302, 2304, 2306 may be stacked one upon another to extend the height of the tower. Each section may include conduits as previously illustrated as conduits 2004, 2006, 2008 in FIG. 20 and shown in phantom in tower section 2306 of FIG. 23. It should be appreciated that while three precast concrete sections 2302, 2304, 2306 are illustrated in FIG. 23, such number of sections is exemplary only. In practice the number of sections may generally vary from one to four depending on desire final height. It should also be noted that while the present disclosure is directed primarily to the provision of precast concrete tower sections, such is not a limitation of the present subject matter in that these sections may be constructed of other materials including steel.

After the desire number of precast concrete tower sections have been stacked, a final cylindrical steel section 2308 is positioned within the stacked concrete sections and lowered so as to contact the plural pedestals 1904, 1906, 1908 secured to the upper surface of lifting plate 1902 (FIG. 19). Cylindrical steel section 2308 includes a ringed tooth engagement mechanism (not separately illustrated) on the lower portion of cylindrical steel section 2308 so that when cylindrical steel section 2308 is raised and later rotated the mechanism meshes with a locking tooth mechanism installed on the top portion of the top concrete tower section as will be explained more fully with reference to FIGS. 24-27.

Figure 24:
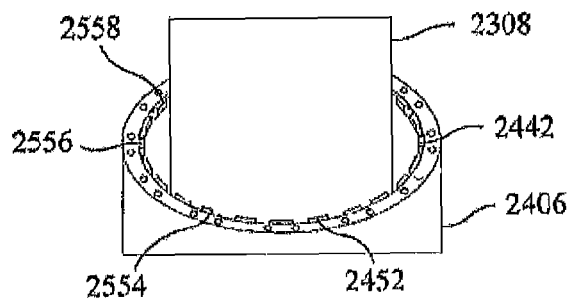
FIGS. 24-27 illustrate several stages in the construction of a toothed locking ring atop the topmost precast concrete tower section.
Figure 25:
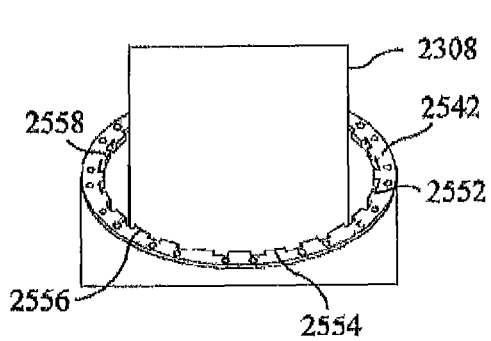
Figure 26:
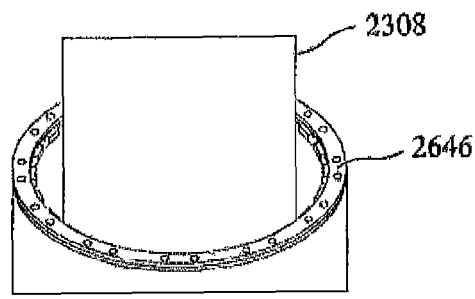
Figure 27:
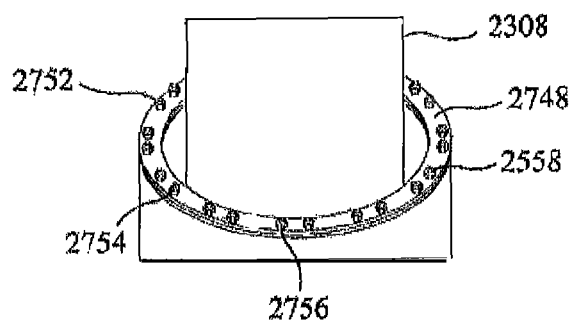

First as may be seen in FIG. 24, an initial ring 2442, is precast into the top cylindrical precast concrete section 2406. Ring 2442 includes a number of support teeth 2452, 2454, 2456, 2458 around the central portion thereof. Toothed ring 2542 (FIG. 25), corresponding to toothed ring 2442 of FIG. 24, as may be better observed in an exposed view, has provided thereon extending radially toward the center of ring 2544 a plurality of teeth 2552, 2554, 2556, 2558 corresponding to the teeth on toothed ring 2442 of FIG. 24. A spacer ring 2646 (FIG. 26) is then placed over toothed ring 2542. As seen in FIG. 26, spacer ring 2646 is narrow enough to leave exposed at least the tooth portions 2552, 2554, 2556, 2558 of ring 2544. Lastly, as illustrated in FIG. 27, an additional ring 2748 is placed over spacer ring 2646. The various rings may all be made of steel and the teeth associated with toothed ring 2542 may be machined to have a slight ramped surface so that the space provided between the surface of ring 2748 facing the plurality of teeth associated with ring 2544 provides frictional engagement of the corresponding teeth on the ringed tooth engagement mechanism secured to steel cylindrical tower section 2308 (FIG. 23).

With reference now to FIG. 27, it will be noticed that a number of securing devices 2752, 2754, 2756, 2758 are provided that secure the ends of metallic strands threaded through the previously discussed conduits provided in the precast concrete tower sections as well as the transition piece supporting staves.

Figure 35:
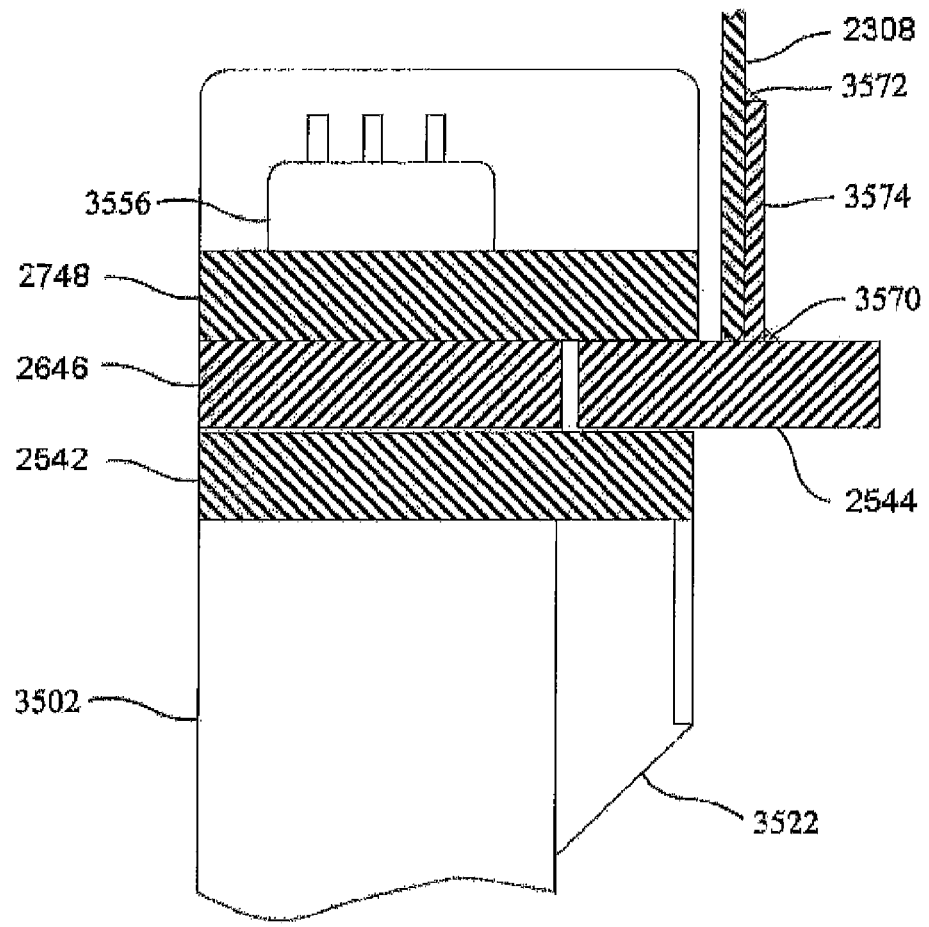
FIG. 35 is a cross sectional view of the assembled locking ring mechanism shown in portions in FIGS. 24-27 and 29.

With brief reference now to FIG. 35, there is illustrated a cross sectional view of the assembled locking ring mechanism shown in portions in FIGS. 24-27. The locking ring mechanism corresponds to a lower toothed ring 2542 which is precast into the upper portion of concrete tower portion 3502. A number of corbels 3522 extend from the inner surface of the concrete tower portion 3502 to assist in supporting toothed ring 2542. Spacer ring 2646 is positioned on top of toothed ring 2542. An additional ring 2748 is placed over spacer ring 2646 and secured in place by a number of securing device represented by securing device 3556 which also secures the ends of metallic strands as previously noted. Steel tower section 2308 has secured to the lower end thereof toothed ring 2544. In an exemplary configuration, toothed ring 2544 may be secured to the lower portion of steel tower section 2308 by welds 3570, 3572. An additional steel band 3574 may be provided for reinforcement of the joint.

Figure 28:
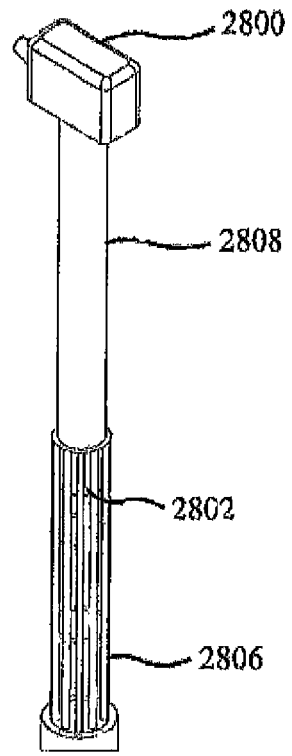
FIG. 28 illustrates an exemplary tower in accordance with present technology in a fully extended position and supporting a wind generator.

Referring now to FIG. 28, it will be seen that a wind powered generator 2800 may be mounted to the top of cylindrical steel section 2808 and the combination raised to a final operating position by forcing compressed air into the space between the end of the lower most precast concrete tower section 2806 and the lifting plate 2802. Those of ordinary skill in the art will appreciate that the normally required wind turbine blades associated with wind generator 2800 may be attached to the generator prior to raising the assembly. Such turbine blades are not presently illustrated.

Figure 29:
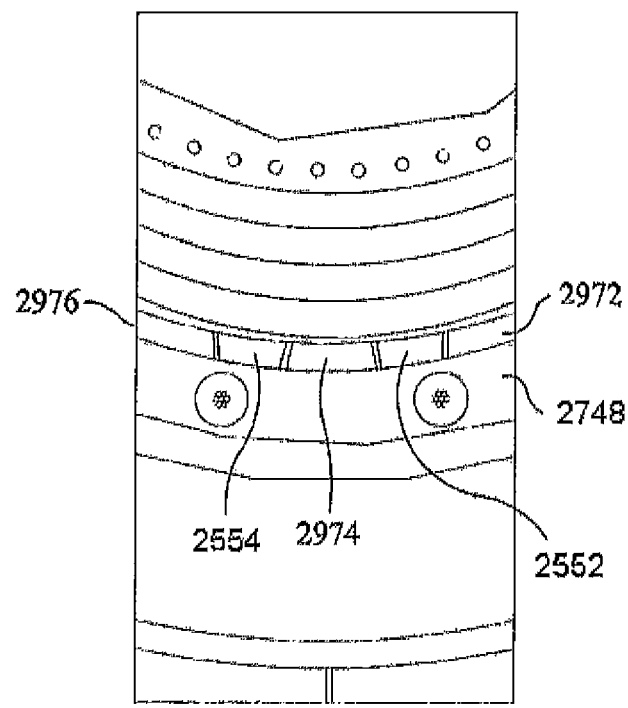
FIG. 29 illustrates a cross section segment of a locking ring mechanism prior to rotation into a locked position.

With reference now to FIG. 29, there is illustrated a cross section segment of a locking ring mechanism prior to rotation into a locked position. As may be seen, the locking mechanism corresponds to a plurality of teeth 2552, 2554 to a further plurality of teeth 2972, 2974, 2976 associated with the previously mentioned ringed tooth engagement mechanism associated with steel cylindrical tower section 2808. As steel cylindrical tower section 2808 is raised by application of air pressure as previously noted, the steel cylindrical tower section 2802 is rotated to align teeth 2552, 2554 to pass between teeth 2972, 2974, 2976. The entire cylindrical tower section 2802 is then rotated so that teeth 2552, 2554 are secured by the caroming effect of teeth 2972, 2974, 2976 and the retaining friction obtained there between and the upper most ring 2748.

Figure 30:
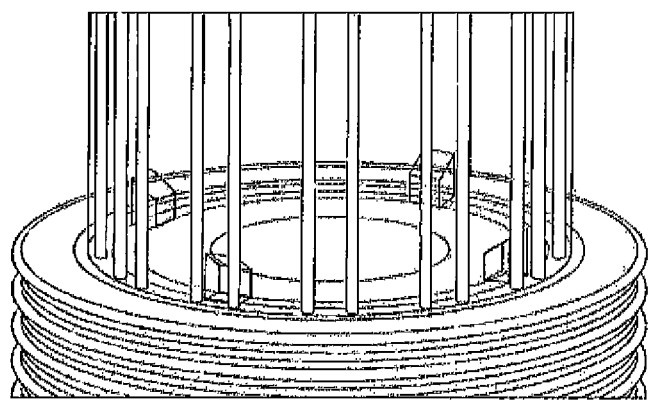
FIG. 30 illustrates partially in phantom an access hole through the precast concrete transition piece after removal of the lifting plate used to raise the steel tower portion into position.

After rotation and locking of the cylindrical tower section 2808, air pressure within the assembled tower is released and lifting plate 1902 returns to its original position at rest on top of transition piece 1912 as seen in FIG. 19. At this time lifting plate 1902 and metallic plate 1842 (FIG. 18) may be removed to provide access to the internal structure of the assembled tower. Alternatively, these components may be left in place in the event that the steel cylindrical tower section and attached wind generator may need to be lowered for repair, replacement, or other maintenance. If these components are to be left in place, access panels may be provided as necessary in metallic plate 1842 and lifting plate 1902 as required. FIG. 30 illustrates a condition where metallic plate 1842 and lifting plate 1902 have been removed while FIG. 31 illustrates the assembled tower in its fully extended position.

With reference now to FIG. 32 there is illustrated a cross section of a portion of a precast concrete base 3216 including ballast fill 3220, 3222 and stave anchoring features 3230 in accordance with certain exemplary embodiments of the present technology. As illustrated in FIG. 32, a feature of the present subject matter resides in the ability of the base support to be provided with minimal excavation requirements. As such, relatively shallow foundations placed just below the frost line for the particular tower location. Generally this will be two to three feet deep. This feature of being able to provide a poured in place circular strip footing as illustrated in FIG. 13 may be extended to a precast concrete sectionalized base as illustrated in FIG. 32. As shown in FIG. 32, base 3216 is provided with a flat lower portion 3240 and includes a radially outward outer upstanding wall 3242 and includes integral formed stave portions 3244. Integral stave portions 3244 include anchoring features 3230 corresponding to the metallic strand receiving conduits previously discussed with respect to FIG. 17 and conduits 1762, 1764, 1766, 1768. A plurality of sections corresponding to base 3216 may be placed in a circular trench containing compacted material 3250 which, in an exemplary configuration, may be one to six feet thick. Each of the plurality of sections may be secured together by metallic threads 3266 threaded through integral conduits 3262, 3264 and the entire assembly may be provided with additional ballast 3220, 3222 in the form of, for example, a stone fill. FIG. 33 illustrates an alternate configuration of the precast base structure that is identical in every way to that of FIG. 32 except that upstanding wall section 3242 has been replaced with a separated corrugated metal structure 3342 and a series of post tensioning bands 3352 which function to retain ballast.

Figure 36:
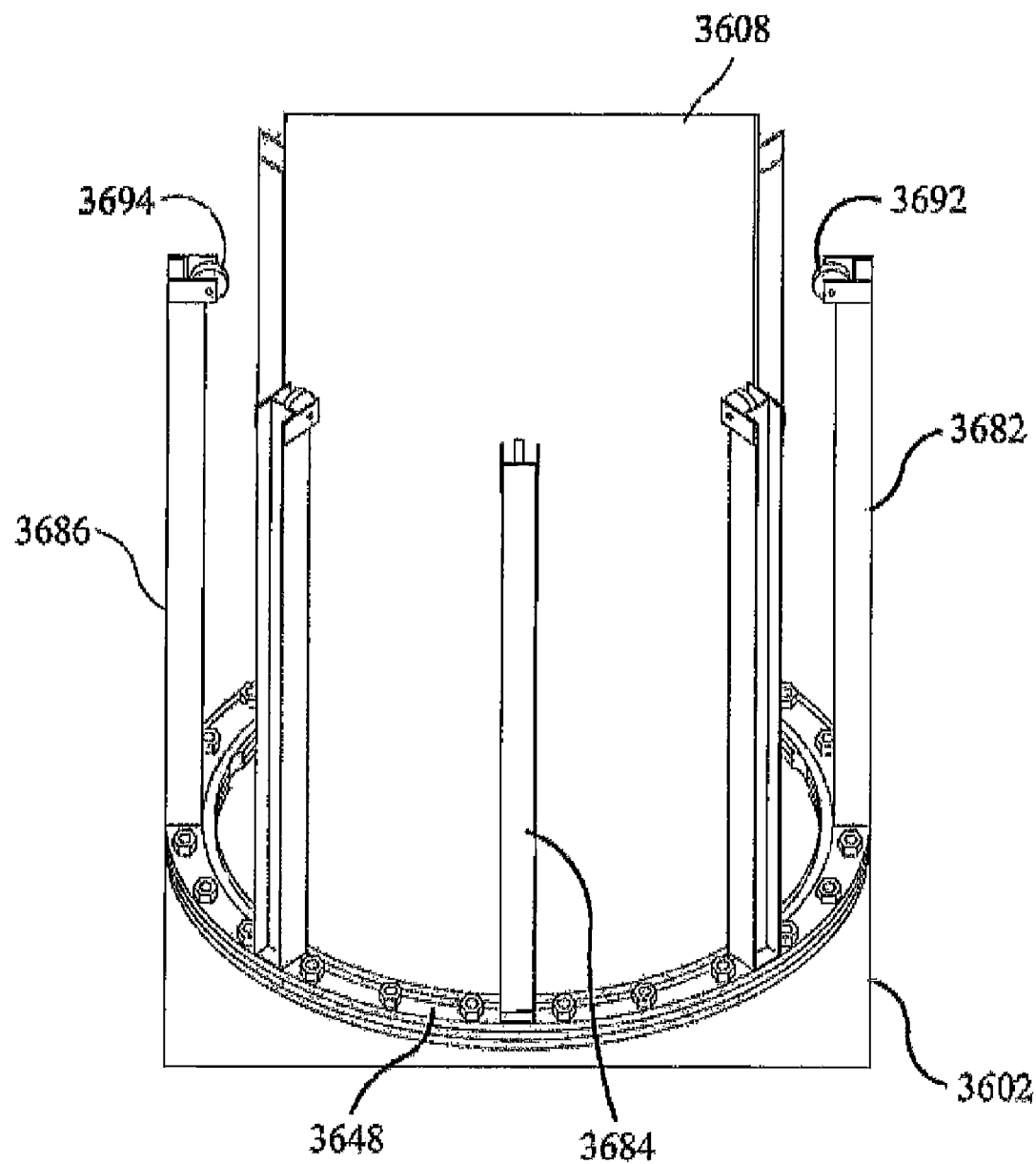
FIG. 36 illustrates the optional use of lateral bracing during erection of the steel tower portion.

Referring now to FIG. 36, there is illustrated the optional use of temporary lateral bracing during erection of the steel tower portion. As may be seen from FIG. 36, a plurality of steel braces 3682, 3684, 3686 may be temporarily, or even permanently, secured to ring 3648 atop concrete tower portion 3602 to function as bracing for steel tower portion 3608 during the erection process. Steel braces 3682, 3684, 3686 may be left in place to provide bracing during lowering of steel tower portion 3608 in a manner similar to the choice of leaving in place lifting plate 1902 (FIG. 19) and metallic plate 1842 (FIG. 18). Atop each steel brace 3682, 3684, 3686 may be provide a mechanism generally illustrated as a roller assembly 3692, 3694 but which may correspond to other mechanisms that more easily provide support for movement in both vertical and horizontal directions to accommodate rotation of steel tower portion 3608 to the final tooth locking position. Further, unillustrated spring loading mechanisms may be provided in association with each of the steel braces 3682, 3684, 3686 to insure supportive contact to the steel tower section 3608.

Figure 37:
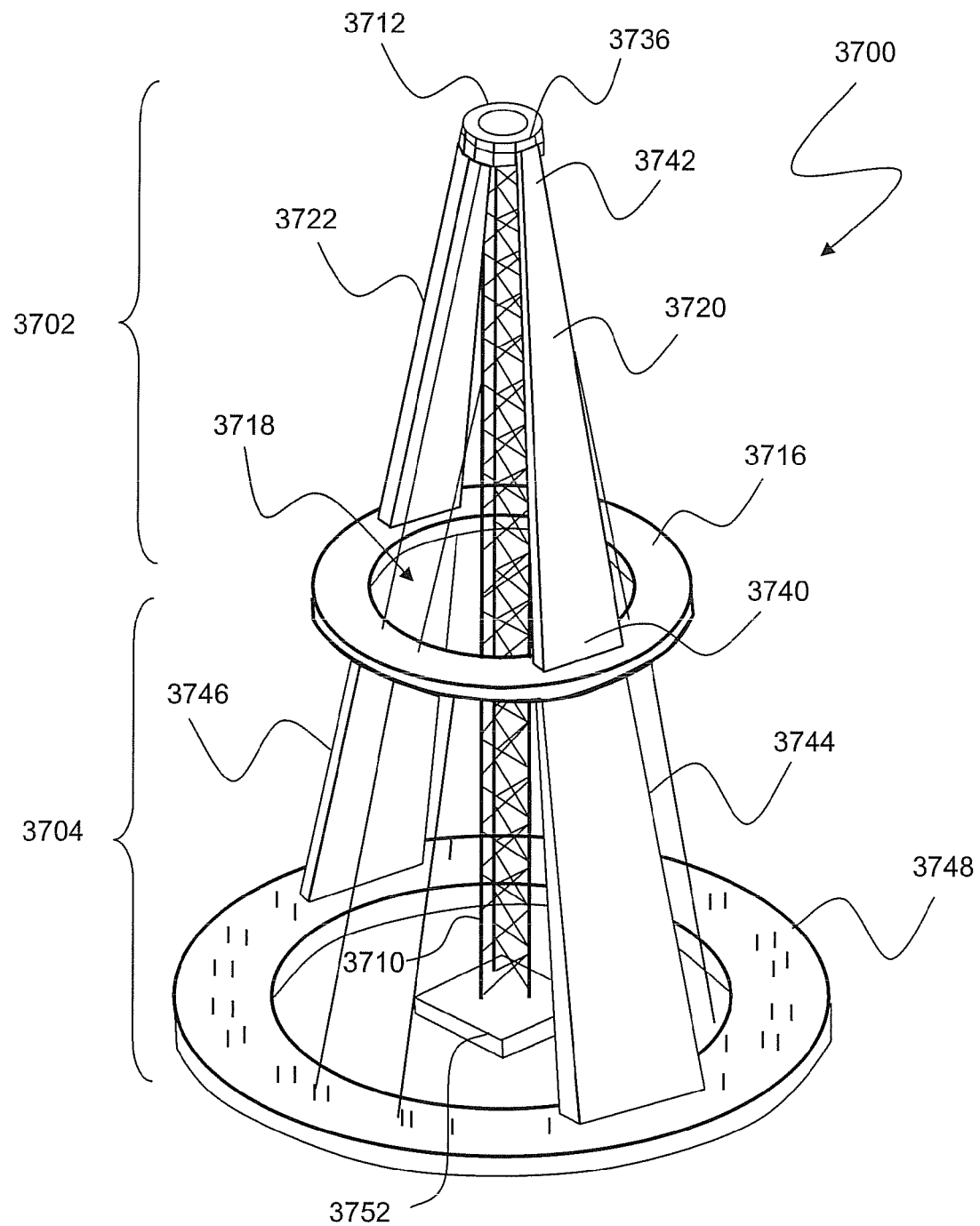
FIG. 37 illustrates preliminary construction of a multistage tower base for use with larger capacity turbines and higher towers.

Referring now to FIG. 37, there is illustrated a multi-stage tower base generally 3700 designed to provide support, for example, for larger capacity turbines positioned at heights higher than single stage tower supports. As seen in FIG. 37, a top portion generally 3702 of multi-stage tower base 3700 is constructed in a manner similar to that shown and described in conjunction with FIGS. 15 and 16. Thus, in FIG. 37 it will be seen that a number of pairs of staves 3720, 3722 are positioned with a wider base portion 3740 resting on concrete base 3716 and a narrower top portion 3742 simply leaning against a correspondingly sized facet 3736 of transition piece 3712.

In a manner similar to that illustrated in FIG. 16, a completed top portion 3702 of skirted tower base 3700 includes concrete base 3716 and plural pairs of staves similar to staves 3720, 3722 positioned with top portions thereof in contact with other facets of transition piece 3712 and bottom portions resting on concrete base 3716. In exemplary configurations, concrete base portion 3716 may be either pre-cast or cast in place.

A lower portion generally 3704 of multi-stage tower base 3700 is similar to the top portion 3702 and supports concrete base 3716 by way of plural pairs of staves exemplarily illustrated as staves 3744, 3746. A central supporting tower 3710 rests on concrete support 3752 and extends from concrete support 3752, through a central opening 3718 in concrete base 3716, and upward to support transition piece 3712. As in previous embodiments, central tower 3710 may correspond to a temporary or permanent structure.

In an exemplary embodiment, the upper portion 3702 of tower base 3700 may incorporate about six pairs or twelve staves while lower portion 3704 may incorporate nine or ten pairs or eighteen to twenty staves. Of course, different numbers of staves may be incorporated in both the upper and lower portions of tower base 3700 depending on construction requirements for a particular embodiment, or depending on particular design criteria for given customers. Also, one or more of such staves may be formed of plural subcomponents, as understood by those of ordinary skill in the art from, for example, the collective stave structure of FIG. 37 and the multi-block structure of the concrete base of FIG. 6.

Figure 38:
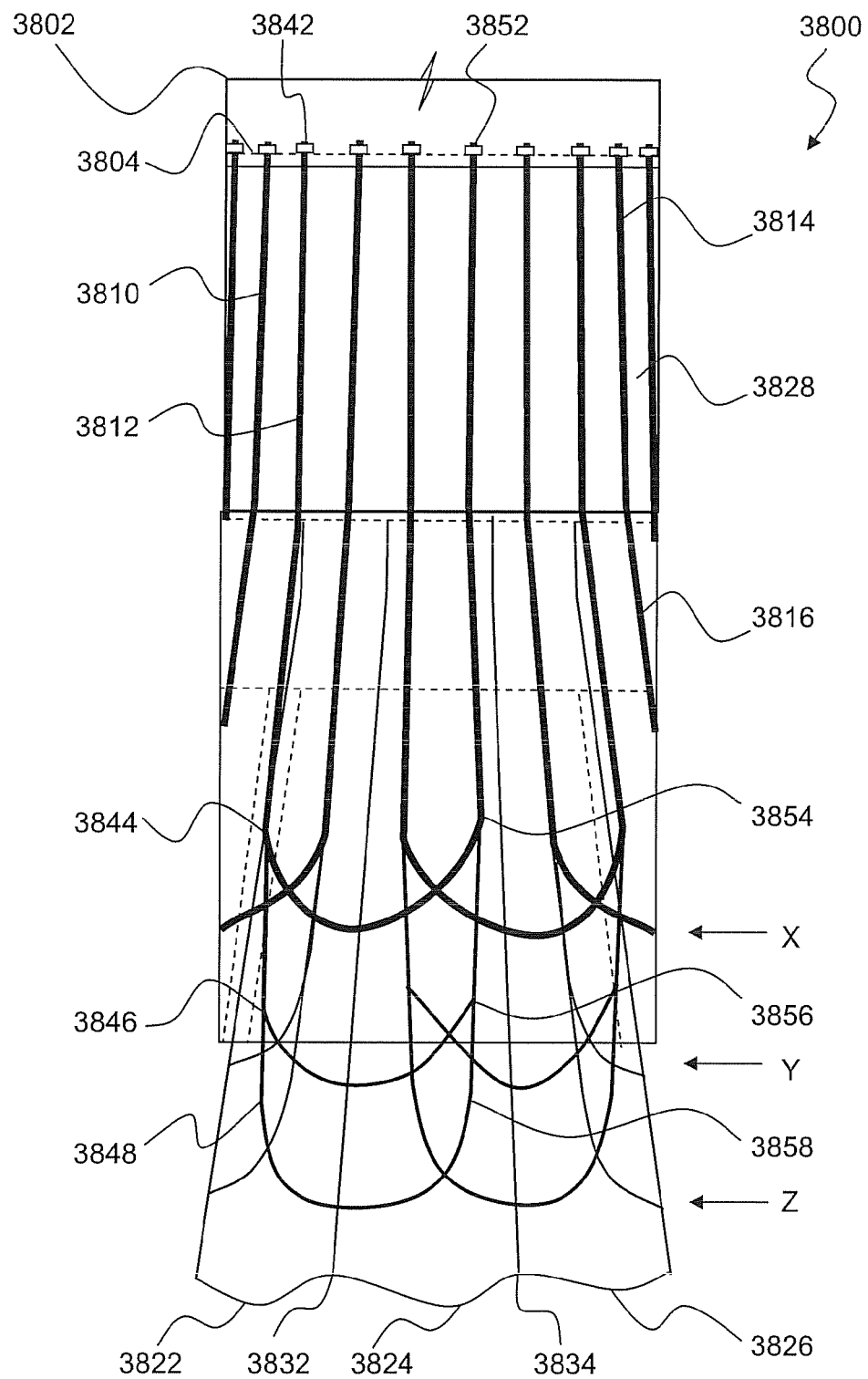
FIG. 38 illustrates an exemplary implementation of "U" shaped tendons to provide multiple joint crossing and enhanced stave retention.

With reference now to FIG. 38, there is illustrated an exemplary implementation of "U" shaped tendons to provide multiple joint crossing and enhanced stave retention. The illustrated tower section corresponds to a number of staves 3822, 3824, 3826 configured to support a concrete ring generally 3828, which staves are secured together at least in part by a number of individual tendons 3810, 3812, 3814, 3816. The assembly is designed to support a cylindrical steel tube section 3802 with the assistance of tube support structure 3804. An upper portion of steel tube 3802 (not shown) may be configured as well understood by those of ordinary skill in the art to support a wind turbine.

Staves 3822, 3824, 3826 abut each other at joints 3832, 3834, and are held in place by tendons 3810, 3812, 3814, 3816. In accordance with present technology, tendons 3810, 3812, 3814, 3816 are configured to pass through tubes cast into concrete ring 3828 and each of the staves 3810, 3812, 3814, 3816 as "U" shaped formations crossing adjacent staves at multiple locations generally designated along lines X, Y, and Z.

An exemplary tendon 3842 is secured at the top of concrete ring 3828 and passes through tubes embedded in concrete ring 3828. Such exemplary tendon 3842 then passes through similar tubes embedded in stave 3822 until it reaches a point 3844 where the tendon is divided into a first portion that loops around to point 3854 and exits at point 3852 again at the top of concrete ring 3828. A second portion of tendon 3842 continues on to point 3846 where it again is split, with one portion going to point 3856 and a second portion going on to point 3848. The tendon portion advancing to point 3848 passes through tubes embedded in both staves 3822 and 3824, and then joins up with the remaining portions, including those that pass through tubes in both staves 3822 and 3824 between points 3846 to 3856 and 3844 to 3854. Similar separating and rejoining of the several other tendons occurs with all of the individual staves.

In accordance with present technology, such separating of the individual tendons into multiple portions provides for enhanced coupling of the staves at multiple points along joints 3832, 3824. It should be appreciated that while present discussion describes tendons separating into three portions, each coupling adjacent staves at three separate points; the present subject matter is not so limited; therefore, the tendons may be separated into three, four or five or more portions, each crossing at separate points to secure plural staves.

Figure 39:
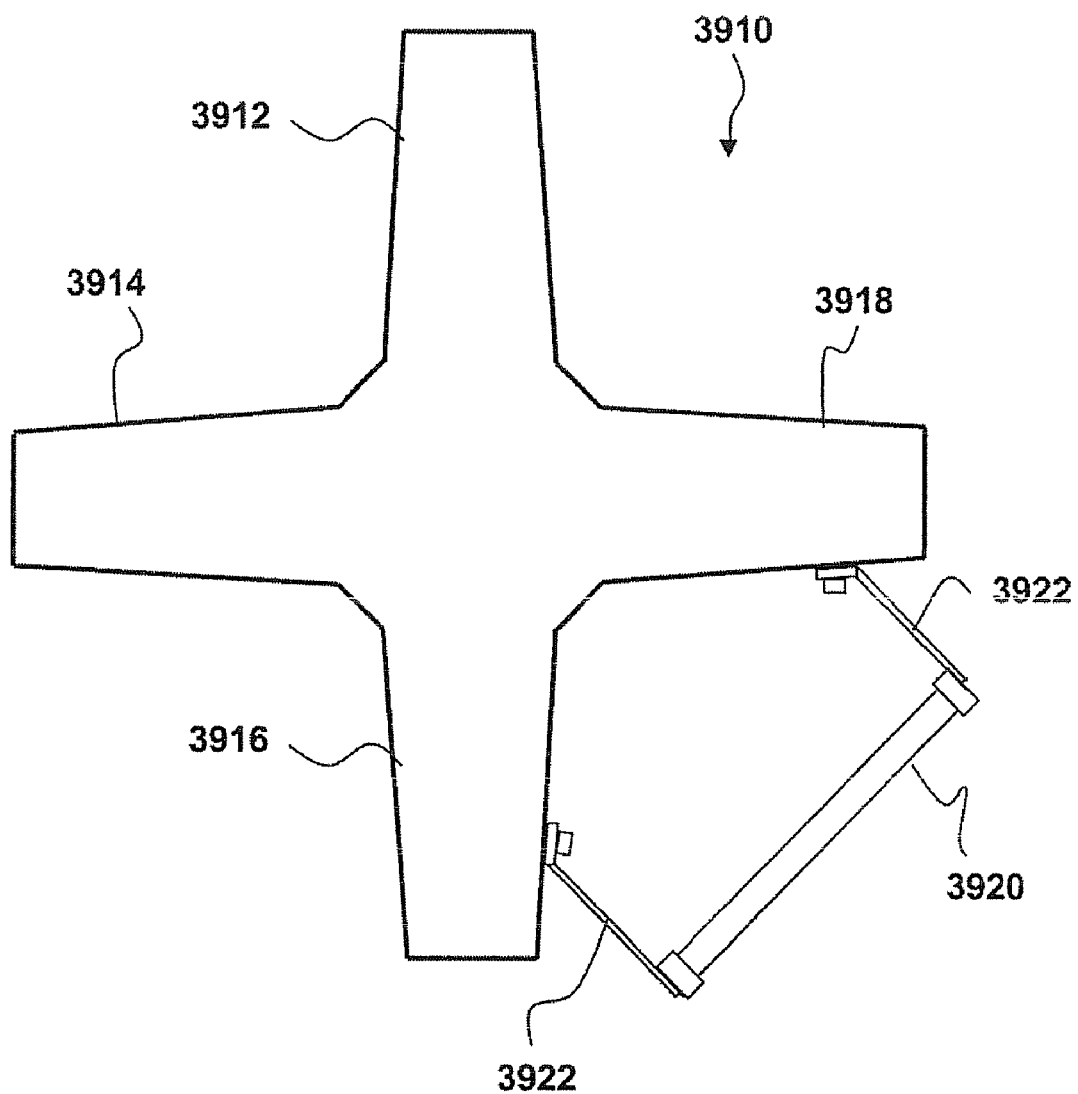
FIG. 39 illustrates a plan view of a support tower in accordance with a further exemplary alternative embodiment of the present subject matter.

With reference now to FIG. 39, there is illustrated an alternative exemplary support tower generally 3910 employed to support the upper portions of an erected tower. The support tower 3910 may be used in place of the temporary support tower 210 illustrated in FIG. 2. Support tower 3910 may be constructed of concrete or any other materials, including steel. As illustrated, support tower 3910 comprises a concrete column having a cruciform cross-section that includes legs 3912, 3914, 3916, and 3918. Those of ordinary skill in the art will appreciate from the disclosure herewith that the cross-section of the column support tower 3910 may have any shape suitable for providing supplemental support to the erected tower. For example, the column support tower 3910 may have a hollow cylindrical cross-section. The column support tower 3910 may be retained after construction of the tower is completed to facilitate access to the upper portions of the erected tower and to serve as a supplemental support structure for the erected tower and other items requiring physical support. An exemplary access ladder 3920 is attached to the column support tower 3910 by mounting brackets 3922. Guy wires and/or compression braces may be secured to the legs 3912, 3914, 3916, and 3918 of the support tower 3910 for added stability.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter (either concerning apparatus or methodology) as would be readily apparent to one of ordinary skill in the art.

What is claimed is:

1. A base structure for a support tower, comprising:
   a ring foundation pad;
   a transition piece disposed above said ring foundation pad; and
   a plurality of staves positioned around said transition piece, each of said plurality of staves respectively comprising a top portion and a bottom portion, the bottom portion of each said stave being wider than the top portion of each said stave;
   wherein said bottom portion of each said stave is respectively secured to said ring foundation pad and said top portion of each said stave is respectively secured to said transition piece;
   wherein said plurality of staves includes at least one conduit extending through said staves and at least one tendon extending through such conduit; and
   wherein said conduit is a U-shaped conduit extending partially through plural staves.

2. A base structure as in claim 1, wherein said plurality of staves and said transition piece are constructed primarily of concrete.

3. A base structure as in claim 1, further including a plurality of anchor elements, located on said ring foundation pad, and respectively configured to secure one of said staves against radial and lateral movement.

4. A base structure as in claim 3, wherein:
   each of said plurality of anchor structures includes a receiving conduit, adapted to receive a tendon threaded through one of said plurality of staves; and
   each of said plurality of staves includes at least one conduit extending therethrough, with at least one tendon extending through such conduit.

5. A base structure as in claim 1, further including:
   a central foundation pad situated within said ring foundation pad; and
   a tower structure supported on said central foundation pad, with said transition piece positioned on top of said tower structure.

6. A base structure as in claim 1, wherein:
   said transition piece includes a plurality of facets around a perimeter thereof; and
   said top portion of each said stave is configured to be respectively adhered to one of said plurality of facets.

7. A base structure as in claim 1, wherein said transition piece further defines an aperture formed through a central portion thereof.

8. A base structure as in claim 7, wherein said aperture has an elliptical shape.

9. A base structure as in claim 1, wherein said conduit is a U-shaped conduit comprising first and second legs connected by a horizontal portion, said first leg of said U-shaped conduit extending through a first stave of said plurality of staves and said second leg of said U-shaped conduit extending through a second stave of said plurality of staves.

10. A base structure as in claim 9, wherein said horizontal portion of said U-shaped conduit extends across a plurality of staves.

11. A base structure as in claim 1, wherein:
    said ring foundation pad is constructed of a plurality of foundation sections; and
    said plurality of foundation sections are secured together by a metallic strand threaded through said plurality of foundation sections.

12. A base structure as in claim 1, wherein:
    said transition piece comprises a central ring structure; and
    said base structure is a multi-staged base structure comprising:
    an upper transition piece disposed above said central ring structure; and
    a plurality of upper staves surrounding said upper transition piece, each said upper stave respectively comprising a top portion and a lower portion, the bottom portion of each said upper stave being wider than the top portion of each said upper stave, and with said lower portion of each such upper stave being secured to said central ring structure and said upper portion thereof being secured to said upper transition piece.

13. A base structure as in claim 1, wherein:
    said base structure comprises a plurality of tubular structures stacked on top of said transition piece; and
    said plurality of tubular structures are constructed primarily of concrete.

14. A base structure as in claim 1, wherein:
    each of said plurality of tubular structures includes a conduit extending therethrough; and
    said base structure further includes at least one tendon threaded through said conduit of said tubular structure and through a conduit located in one of said plurality of staves, for securing said tubular structure to said transition piece.

15. The base structure for a support tower of claim 1, wherein said plurality of staves form a conical skirt, said conical skirt operating to distribute a tower load to said ring foundation pad.

16. The base structure for a support tower of claim 1, wherein at least some of said plurality of staves comprise plural subcomponents.

17. The base structure for a support tower of claim 1, wherein said base structure comprises a plurality of external ballasts, said external ballasts configured to add additional dead load to said ring foundation pad.

* * * * *